(12) United States Patent
Jiao et al.

(10) Patent No.: US 12,598,587 B2
(45) Date of Patent: Apr. 7, 2026

(54) RESOURCE INDICATION INFORMATION TRANSMISSION METHOD, DEVICE, AND SYSTEM

(71) Applicant: HUAWEI TECHNOLOGIES CO., LTD., Shenzhen (CN)

(72) Inventors: Chunxu Jiao, Shanghai (CN); Lei Dong, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 512 days.

(21) Appl. No.: 17/970,791

(22) Filed: Oct. 21, 2022

(65) Prior Publication Data

US 2023/0044879 A1     Feb. 9, 2023

Related U.S. Application Data

(63) Continuation of application No. PCT/CN2020/086717, filed on Apr. 24, 2020.

(51) Int. Cl.
*H04W 72/02* (2009.01)
*H04W 72/0446* (2023.01)
(Continued)

(52) U.S. Cl.
CPC ....... *H04W 72/02* (2013.01); *H04W 72/0446* (2013.01); *H04W 72/0453* (2013.01); *H04W 72/20* (2023.01)

(58) Field of Classification Search
None
See application file for complete search history.

(56) References Cited

U.S. PATENT DOCUMENTS

2020/0029318 A1     1/2020  Guo
2021/0250954 A1*    8/2021  Li ......................... H04W 72/56
(Continued)

FOREIGN PATENT DOCUMENTS

CN     109121214 A     1/2019
CN     110519030 A     11/2019
(Continued)

OTHER PUBLICATIONS

Huawei et al., "Overview of Rel-17 Work Areas for NR and LTE," 3GPP TSG RAN Meeting #84, RP-191007, Newport Beach, USA, Jun. 3-6, 2019, 22 pages.
(Continued)

*Primary Examiner* — The Hy Nguyen
(74) *Attorney, Agent, or Firm* — Fish & Richardson P.C.

(57) ABSTRACT

Embodiments of this application provide a resource indication information transmission method, a device, and a system, which are applicable to fields such as internet of vehicles, intelligent connected vehicle, assisted driving, and intelligent driving. In an example method, a first terminal device determines X sets of candidate single-time-unit resources based on a number of sub-channels to be used by a second terminal device for physical sidelink shared channel (PSSCH) and/or physical sidelink control channel (PSCCH) transmission, and indicates, to the second terminal device, K candidate single-time-unit resources whose time domain locations are in a first time window in the X sets of candidate single-time-unit resources. The second terminal device determines a first time-frequency resource based on the K candidate single-time-unit resources. The first time window is a time window included in a selection window corresponding to at least one of the X sets of candidate single-time-unit resources.

22 Claims, 9 Drawing Sheets

(51) Int. Cl.

| | |
|---|---|
| *H04W 72/0453* | (2023.01) |
| *H04W 72/20* | (2023.01) |

(56) References Cited

U.S. PATENT DOCUMENTS

| | | | |
|---|---|---|---|
| 2022/0304007 A1* | 9/2022 | Jabandzic | H04W 72/0446 |
| 2023/0171792 A1* | 6/2023 | Sun | H04W 72/02 |
| | | | 370/329 |

FOREIGN PATENT DOCUMENTS

| | | |
|---|---|---|
| CN | 110662262 A | 1/2020 |
| CN | 111034315 A | 4/2020 |
| WO | 2019066629 A1 | 4/2019 |

OTHER PUBLICATIONS

3GPP TS 38.214 V16.1.0, "3rd Generation Partnership Project; Technical Specification Group Radio Access Network; NR; Physical layer procedures for data (Release 16)," Mar. 2020, 151 pages.

Intel Corporation, "Further Considerations on Sidelink Unicast/Groupcast/Broadcast for NR V2X Communication," 3GPP TSG RAN WG1 Meeting #95, R1-1812492, Spokane, USA, Nov. 12-16, 2018, 7 pages.

3GPP TS 38.212 V16.1.0, "3rd Generation Partnership Project; Technical Specification Group Radio Access Network; NR; Multiplexing and Channel Coding (Release 16)," Mar. 2020, 146 pages.

CMCC, "Discussion on Resource Allocation Mechanism for NR V2X," 3GPP TSG RAN WG1 Ad-Hoc Meeting 1901, R1-1900406, Taipei, Jan. 21-25, 2019, 4 pages.

3GPP TS 38.321 V16.0.0, "3rd Generation Partnership Project; Technical Specification Group Radio Access Network; NR; Medium Access Control (MAC) Protocol Specification (Release 16)," Mar. 2020, 141 pages.

LG Electronics, "New WID on NR Sidelink Enhancement," 3GPP TSG RAN Meeting #86, RP-193134, Sitges, Spain, Dec. 9-12, 2019, 6 pages.

International Search Report and Written Opinion in International Appln. No. PCT/CN2020/086717, mailed on Jan. 13, 2021, 19 pages (with English translation).

Samsung, "On Resource Allocation for NR V2X Mode 2," 3GPP TSG RAN WG1 #98bis, R1-1910471, Chongqing, China, Oct. 14-20, 2019, 7 pages.

LG Electronics, "Summary of RAN1 Agreements/Working assumptions in WI 5G V2X with NR sidelink," 3GPP TSG RAN WG1 #99, R1-1913601, Reno, USA, Nov. 18-22, 2019, 40 pages.

3GPP TS 36.213 V14.2.0, S14, "Physical layer procedures (Release 14), Section 14 : UE procedures related to Sidelink," Mar. 23, 2017, 57 pages.

Extended European Search Report in European Appln No. 20931858.3, dated Mar. 29, 2023, 11 pages.

* cited by examiner

RESOURCE INDICATION INFORMATION TRANSMISSION METHOD, DEVICE, AND SYSTEM

CROSS-REFERENCE TO RELATED APPLICATIONS

This application is a continuation of International Application No. PCT/CN2020/086717, filed on Apr. 24, 2020, the disclosure of which is hereby incorporated by reference in its entirety.

TECHNICAL FIELD

This application relates to the communication field, and in particular, to a resource indication information transmission method, a device, and a system.

BACKGROUND

In a new radio (new radio, NR) system, a PC5 interface is a communication interface between terminal devices, and a transmission link over the PC5 interface is referred to as a sidelink (sidelink, SL).

There are two modes (mode) for resource allocation (resource allocation, RA) in SL transmission: mode 1 and mode 2, which are classified based on different resource allocation subjects. In mode 1, time-frequency resources for SL transmission are centrally scheduled by a network device, while in mode 2, time-frequency resources for SL transmission are determined by a terminal device. Mode 2 may further include mode 2(a). In this mode, the terminal device selects, based on sensing (sensing) of the terminal device, time-frequency resources for SL transmission. However, in mode 2(a), there are a hidden node problem and an exposed node problem.

For the hidden node, a data receiver of the terminal device is the same as a data receiver of the hidden node of the terminal device, and the terminal device cannot learn of a time-frequency resource and reservation status of the hidden node of the terminal device in mode 2(a). Therefore, the terminal device and the hidden node of the terminal device may select a same time-frequency resource, resulting in collision and interference between terminal devices.

For the exposed node, a data receiver of the terminal device is different from a data receiver of the exposed node of the terminal device. Therefore, even if the terminal device and the exposed node of the terminal device use a same time-frequency resource, no strong interference is generated. However, in actual application, the terminal device does not use a time-frequency resource used or reserved by the exposed node of the terminal device, resulting in low resource utilization.

SUMMARY

Embodiments of this application provide a resource indication information transmission method, a device, and a system, to reduce interference between terminal devices or improve resource utilization.

To achieve the foregoing objectives, the following technical solutions are used in embodiments of this application.

According to a first aspect, a resource indication information transmission method is provided. The method may be performed by a first terminal device, or may be performed by a component of the first terminal device, for example, a processor, a chip, or a chip system of the first terminal device. In this application, an example in which the first terminal device performs the method is used for description. The method includes. The first terminal device determines X sets of candidate single-time-unit resources based on a first number of sub-channels, determines first information based on the X sets of candidate single-time-unit resources, and sends the first information to a second terminal device.

The first number of sub-channels is a number of sub-channels to be used by the second terminal device for PSSCH and/or PSCCH transmission, X is a positive integer, different sets of candidate single-time-unit resources correspond to different selection windows, each of the X sets of candidate single-time-unit resources includes one or more candidate single-time-unit resources, and the candidate single-time-unit resource includes one time unit in time domain and one or more contiguous sub-channels in frequency domain. The first information indicates K candidate single-time-unit resources, the K candidate single-time-unit resources are a part of or all candidate single-time-unit resources whose time-domain locations are in a first time window in the X sets of candidate single-time-unit resources, the first time window is a time window included in a selection window corresponding to at least one of the X sets of candidate single-time-unit resources, and K is a positive integer.

Based on this solution, the first terminal device serves as a data receiver of the second terminal device, and the X sets of candidate single-time-unit resources determined by the first terminal device may not include time-frequency resources that have been used and reserved by a hidden node of the second terminal device. Therefore, when determining a time-frequency resource based on the first information after receiving the first information, the second terminal device cannot select a resource that is the same as that of the hidden node of the second terminal device. This avoids collision and reduces interference between terminal devices. Alternatively, the first terminal device serves as a data receiver of the second terminal device, and the X sets of candidate single-time-unit resources determined by the first terminal device may include time-frequency resources that have been used and reserved by an exposed node of the second terminal device. Therefore, when determining a time-frequency resource based on the first information after receiving the first information, the second terminal device may select a time-frequency resource reserved by the exposed node of the second terminal device. This improves resource utilization.

In a possible design, that the first terminal device sends the first information to a second terminal device may include: The first terminal device sends second-stage SCI to the second terminal device, where the second-stage SCI includes the first information; the first terminal device sends a MAC CE to the second terminal device, where the MAC CE includes the first information; or the first terminal device sends RRC signaling to the second terminal device, where the RRC signaling includes the first information.

Based on this possible design, the first information may be transmitted in a plurality of modes, to improve transmission flexibility of the first information. In addition, because the second-stage SCI is transmitted on a PSSCH, the second-stage SCI has better flexibility than first-stage SCI transmitted on a PSCCH. Therefore, transmitting the first information via the second-stage SCI may improve the transmission flexibility of the first information.

In a possible design, that the first terminal device determines X sets of candidate single-time-unit resources based on a first number of sub-channels may include: The first terminal device determines the X sets of candidate single-time-unit resources through sensing based on the first number of sub-channels. In other words, the first terminal device may determine the X sets of candidate single-time-unit resources in a resource allocation mode 2(a), and a candidate single-time-unit resource included in a set of candidate single-time-unit resources includes sub-channels of the first number in frequency domain.

In a possible design, the resource indication information transmission method may further include: The first terminal device sends second information to the second terminal device, where the second information includes one or more of the following: the first number of sub-channels, a length of the first time window, a time unit interval, a total number of first-type time units in the first time window, or a number of candidate single-time-unit resources indicated by the first information, the time unit interval is an interval between a time unit for sending the first information and a start time unit of the first time window, and there is a candidate single-time-unit resource in the first-type time unit.

Based on this possible design, the second terminal device may be assisted in correctly parsing the first information, to improve accuracy of determining a time-frequency resource based on the first information, and improve efficiency.

According to a second aspect, a resource indication information transmission method is provided. The method may be performed by a second terminal device, or may be performed by a component of the second terminal device, for example, a processor, a chip, or a chip system of the second terminal device. In this application, an example in which the second terminal device performs the method is used for description. The method includes: The second terminal device receives first information from a first terminal device, and determines a first time-frequency resource based on the first information, where the first time-frequency resource is used by the second terminal device for PSSCH and/or PSCCH transmission.

The first information indicates K candidate single-time-unit resources, the K candidate single-time-unit resources are a part of or all candidate single-time-unit resources whose time domain locations are in a first time window in X sets of candidate single-time-unit resources, and K and X are positive integers. In the X sets of candidate single-time-unit resources, different sets of candidate single-time-unit resources correspond to different selection windows, and the first time window is a time window included in a selection window corresponding to at least one of the X sets of candidate single-time-unit resources.

Based on this solution, because the first terminal device serves as a data receiver of the second terminal device, the K candidate single-time-unit resources indicated by the first terminal device to the second terminal device may not include time-frequency resources that have been used and reserved by a hidden node of the second terminal device. Therefore, when receiving the first information and determining a time-frequency resource based on the first information, the second terminal device cannot select a resource that is the same as that of the hidden node of the second terminal device. This avoids collision and reduces interference between terminal devices. Alternatively, the first terminal device serves as a data receiver of the second terminal device, and the K candidate single-time-unit resources indicated by the first terminal device to the second terminal device may include time-frequency resources that have been used and reserved by an exposed node of the second terminal device. Therefore, when receiving the first information and determining a time-frequency resource based on the first information, the second terminal device may select a time-frequency resource reserved by the exposed node of the second terminal device. This improves resource utilization.

In a possible design, that the second terminal device determines a first time-frequency resource based on the first information may include: The second terminal device determines the first time-frequency resource based on the first information and a first set of candidate single-time-unit resources, where the first set of candidate single-time-unit resources is a set of candidate single-time-unit resources determined by the second terminal device.

Based on this possible design, the first time-frequency resource determined by the second terminal device may include a candidate single-time-unit resource that is not included in the first set of candidate single-time-unit resources but included in the K candidate single-time-unit resources indicated by the first information. In other words, the second terminal device may select, based on the first information, a time-frequency resource reserved by the exposed node of the second terminal device. This improves resource utilization. Alternatively, the first time-frequency resource determined by the second terminal device based on the first information and the first set of candidate single-time-unit resources does not include a candidate single-time-unit resource that is not included in the K candidate single-time-unit resources indicated by the first information but is included in the first set of candidate single-time-unit resources. In other words, during resource selection, the second terminal device may avoid selecting a resource that is the same as that of the hidden node of the second terminal device. This avoids collision and reduces interference between terminal devices.

In a possible design, that the second terminal device determines a first time-frequency resource based on the first information may include: The second terminal device determines, as the first time-frequency resource, a part of or all of the K candidate single-time-unit resources indicated by the first information.

Based on this possible design, when determining the first time-frequency resource, the second terminal device does not need to determine a set of candidate single-time-unit resources through sensing, so that power consumption of the second terminal device may be reduced.

In a possible design, that the second terminal device receives first information from a first terminal device may include: The second terminal device receives second-stage SCI from the first terminal device, where the second-stage SCI includes the first information: the second terminal device receives a MAC CE from the first terminal device, where the MAC CE includes the first information; or the second terminal device receives RRC signaling from the first terminal device, where the RRC signaling includes the first information.

Based on this possible design, the first information may be transmitted in a plurality of modes, to improve transmission flexibility of the first information. In addition, because the second-stage SCI is transmitted on a PSSCH, the second-stage SCI has better flexibility than first-stage SCI transmitted on a PSCCH. Therefore, transmitting the first information via the second-stage SCI may improve the transmission flexibility of the first information.

In a possible design, the resource indication information transmission method may further include: The second terminal device receives second information from the first terminal device, and parses the first information based on the second information. The second information includes one or more of the following: a first number of sub-channels, a length of the first time window, a time unit interval, a total number of first-type time units in the first time window, or a number of candidate single-time unit resources indicated by the first information, where the time unit interval is an interval between a time unit for sending the first information and a start time unit of the first time window, and there is a candidate single-time-unit resource in the first-type time unit.

Based on this possible design, the second terminal device may be assisted in correctly parsing the first information, to improve accuracy of determining a time-frequency resource based on the first information, and improve efficiency.

With reference to the first aspect and the second aspect, in a possible design, the start time unit of the first time window is a time unit after a time unit m, and the time unit m is a time unit for sending the first information.

Based on this possible design, because the start time unit of the first time window is a time unit after the time unit for sending the first information, the time domain locations of the K candidate single-time-unit resources indicated by the first information are after the time unit m. In this way, this may avoid that the first information indicates a useless candidate single-time-unit resource whose time domain location is before the time unit m, to reduce transmission overheads.

With reference to the first aspect and the second aspect, in a possible design, X is greater than 1, and that the K candidate single-time-unit resources are K candidate single-time-unit resources whose time domain locations are in the first time window in the X sets of candidate single-time-unit resources may include. The K candidate single-time-unit resources are a part of or all candidate single-time-unit resources whose time domain locations are in the first time window in an intersection set or a union set of the X sets of candidate single-time-unit resources.

Based on this possible design, when an intersection set of the X sets of candidate single-time-unit resources is used, the K candidate single-time-unit resources are candidate single-time-unit resources included in all the X sets of candidate single-time-unit resources, and a possibility that the K candidate single-time-unit resources are occupied or reserved by another terminal device is low. This can reduce a possibility of a resource conflict, so as to improve transmission performance. When a union set of the X sets of candidate single-time-unit resources is used, more candidate single-time-unit resources can be selected by the second terminal device, so as to improve diversity and flexibility of the first time-frequency resource.

With reference to the first aspect and the second aspect, in a possible design, the first information is indicated by M bits, and M is determined based on the length of the first time window, the first number of sub-channels, and a total number of sub-channels of a first resource pool.

With reference to the first aspect and the second aspect, in a possible design. M, the length of the first time window, the first number of sub-channels, and the total number of sub-channels of the first resource pool satisfy the following first formula:

$$M=Y\times N_{subCH}-L_{subCH,1}+1), \text{ where}$$

Y is the length of the first time window, $N_{subCH}$ is the total number of sub-channels of the first resource pool, and $L_{subCH, 1}$ is the first number of sub-channels; and that the first information is indicated by M bits includes: the M bits constitute a bitmap, and every $N_{subCH}-L_{subCH, 1}+1$ bits in the bitmap indicate availability of each candidate single-time-unit resource in one of the Y time units.

With reference to the first aspect and the second aspect, in a possible design, M, the length of the first time window, the first number of sub-channels, and the total number of sub-channels of the first resource pool satisfy the following second formula:

$$M=Y+y\times(N_{subCH}-L_{subCH,1}+1), \text{ where}$$

Y is the length of the first time window, y is the total number of first-type time units in the first time window, there is a candidate single-time-unit resource in the first-type time unit, $N_{subCH}$ is the total number of sub-channels of the first resource pool, and $L_{subCH, 1}$ is the first number of sub-channels; and that the first information is indicated by M bits includes: the M bits constitute a bitmap, the bitmap includes a first bitmap and a second bitmap, the first bitmap indicates y first-type time units, the second bitmap indicates availability of each candidate single-time-unit resource in an $i^{th}$ first-type time unit, and i is a positive integer from 1 to y.

With reference to the first aspect and the second aspect, in a possible design, M, the length of the first time window, the first number of sub-channels, and the total number of sub-channels of the first resource pool satisfy the following third formula:

$$M=\lceil\log_2(Y^K)\rceil+\lceil\log_2(N_{subCH}-L_{subCH,1}+1)^K\rceil, \text{ where}$$

Y is the length of the first time window, $N_{subCH}$ is the total number of sub-channels of the first resource pool, $L_{subCH, 1}$ is the first number of sub-channels, and $\lceil \; \rceil$ represents rounding up; and that the first information is indicated by M bits includes: $\lceil\log_2(Y^K)\rceil$ bits in the M bits indicate time domain information of the K candidate single-time-unit resources, and other $\lceil\log_2(N_{subCH}-L_{subCH,1}+1)^K\rceil$ bits in the M bits indicate frequency domain information of the K candidate single-time-unit resources.

According to a third aspect, a communication apparatus is provided, to implement the foregoing methods. The communication apparatus may be the first terminal device in the first aspect, an apparatus including the first terminal device, or an apparatus included in the first terminal device, for example, a chip. Alternatively, the communication apparatus may be the second terminal device in the second aspect, an apparatus including the second terminal device, or an apparatus included in the second terminal device. The communication apparatus includes a corresponding module, unit, or means (means) for implementing the foregoing methods. The module, unit, or means may be implemented by hardware, software, or hardware executing corresponding software. The hardware or the software includes one or more modules or units corresponding to the foregoing functions.

According to a fourth aspect, a communication apparatus is provided. The apparatus includes a processor and a memory. The memory is configured to store computer instructions. When the processor executes the instructions, the communication apparatus is enabled to perform the method according to any one of the foregoing aspects. The communication apparatus may be the first terminal device in the first aspect, an apparatus including the first terminal device, or an apparatus included in the first terminal device, for example, a chip. Alternatively, the communication apparatus may be the second terminal device in the second aspect, an apparatus including the second terminal device, or an apparatus included in the second terminal device.

According to a fifth aspect, a communication apparatus is provided. The apparatus includes a processor and an interface circuit. The interface circuit may be a code/data read/write interface circuit. The interface circuit is configured to: receive computer instructions (where the computer instructions are stored in a memory, and may be directly read from the memory, or may pass through another component), and transmit the computer instructions to the processor. The processor is configured to run the computer instructions to perform the method according to any one of the foregoing aspects. The communication apparatus may be the first terminal device in the first aspect, an apparatus including the first terminal device, or an apparatus included in the first terminal device, for example, a chip. Alternatively, the communication apparatus may be the second terminal device in the second aspect, an apparatus including the second terminal device, or an apparatus included in the second terminal device.

According to a sixth aspect, a communication apparatus is provided. The apparatus includes a processor. The processor is configured to: be coupled (or connected) to a memory, and after reading instructions in the memory, perform the method according to any one of the foregoing aspects according to the instructions. The communication apparatus may be the first terminal device in the first aspect, an apparatus including the first terminal device, or an apparatus included in the first terminal device, for example, a chip. Alternatively, the communication apparatus may be the second terminal device in the second aspect, an apparatus including the second terminal device, or an apparatus included in the second terminal device.

According to a seventh aspect, a computer-readable storage medium is provided. The computer-readable storage medium stores instructions. When the instructions are executed on a communication apparatus, the communication apparatus is enabled to perform the method according to any one of the foregoing aspects. The communication apparatus may be the first terminal device in the first aspect, an apparatus including the first terminal device, or an apparatus included in the first terminal device, for example, a chip. Alternatively, the communication apparatus may be the second terminal device in the second aspect, an apparatus including the second terminal device, or an apparatus included in the second terminal device.

According to an eighth aspect, a computer program product including instructions is provided. When the computer program product runs on a communication apparatus, the communication apparatus is enabled to perform the method according to any one of the foregoing aspects. The communication apparatus may be the first terminal device in the first aspect, an apparatus including the first terminal device, or an apparatus included in the first terminal device, for example, a chip. Alternatively, the communication apparatus may be the second terminal device in the second aspect, an apparatus including the second terminal device, or an apparatus included in the second terminal device.

According to a ninth aspect, a communication apparatus is provided (for example, the communication apparatus may be a chip or a chip system). The communication apparatus includes a processor, configured to implement a function according to any one of the foregoing aspects. In a possible design, the communication apparatus further includes a memory, and the memory is configured to store necessary program instructions and data. When the communication apparatus is a chip system, the communication apparatus may include a chip, or may include a chip and another discrete component.

For technical effects brought by any one of the designs of the third aspect to the ninth aspect, refer to technical effects brought by different designs of the first aspect or the second aspect. Details are not described herein again.

According to a tenth aspect, a communication system is provided. The communication system includes the first terminal device in the foregoing aspects and the second terminal device in the foregoing aspects.

DESCRIPTION OF EMBODIMENTS

For ease of understanding technical solutions in embodiments of this application, the following first briefly describes technologies or terms related to this application.

1. Resource Allocation Mode 2

The resource allocation mode 2 may be classified into the following types: mode 2(a), where a terminal device selects, based on sensing (sensing) of the terminal device, time-frequency resources for SL transmission; mode 2(b), where a terminal device assists another terminal device in selecting time-frequency resources for SL transmission; mode 2(c), where a terminal device selects, based on one or more SL sending patterns (patterns) in a configured or preconfigured resource pool, time-frequency resources for SL transmission; and mode 2(d), where a terminal device capable of resource scheduling schedules, for another terminal device, time-frequency resources for SL transmission.

In an existing standard, mode 2(a) can operate normally, but there is no specific implementation method for the other three modes.

2. Resource Allocation Mode 2(a)

In mode 2(a), a time point and two important windows are defined.

Figure 1:
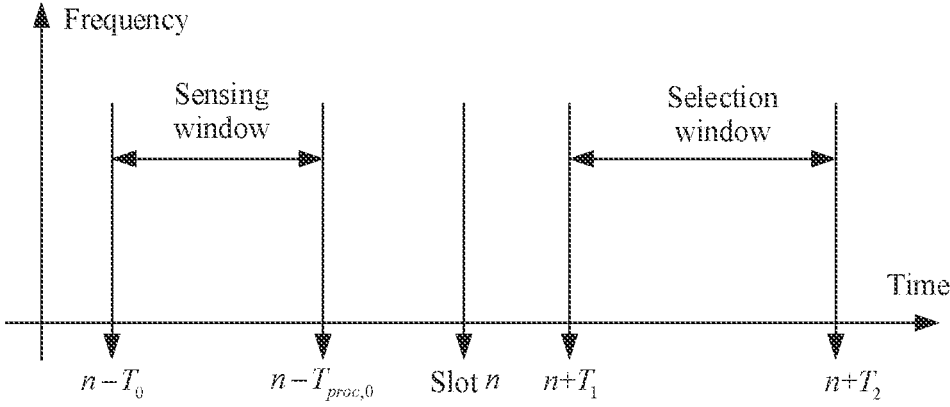
FIG. 1 is a schematic diagram of a resource allocation mode 2(a) according to an embodiment of this application.

The time point is a slot in which a higher layer (higher layer) of a terminal device triggers resource selection for sending a physical sidelink control channel (physical sidelink control channel, PSCCH) and/or a physical sidelink shared channel (physical sidelink shared channel, PSSCH) one time. As shown in FIG. 1, the slot may be referred to as a slot n.

One of the important windows is a sensing window (sensing window), which is a window used by the terminal device to sense occupation of time-frequency resources. For example, the window may correspond to a slot range $[n-T_0, n-T_{proc,0}]$ in FIG. 1. $T_0$ is a value obtained through calculation based on a higher layer parameter. $T_{proc,0}$ is a standard-defined value, a value obtained based on a capability or an implementation of the terminal device, or a value obtained through calculation based on a higher layer parameter. The implementation of the terminal device may refer to a specific software algorithm and hardware implementation of a terminal (for example, a computing chip, a communication chip, a storage chip, a vehicle-mounted chip, or a vehicle-mounted module used by the terminal).

The other important window is a selection window (selection window), which is a window used when the terminal device selects a candidate single-slot resource (candidate single-slot resource) based on a sensing result in a sensing window. For example, the window may correspond to a slot range $[n+T_1, n+T_2]$ in FIG. 1. $T_1$ is a value obtained based on an implementation of the terminal device. $T_2$ is a value obtained based on a higher layer parameter or an implementation of the terminal device.

It should be noted that in embodiments of this application, a slot is a time unit used in transmission of uplink information, downlink information, or sidelink information in a system (for example, an NR system). The slot may include a plurality of mini-slots, and a mini-slot may include one or more orthogonal frequency division multiplexing (orthogonal frequency division multiplexing, OFDM) symbols. Optionally, the slot or the mini-slot may be a minimum scheduling unit in time domain used in transmission of uplink information, downlink information, or sidelink information.

Figure 2:
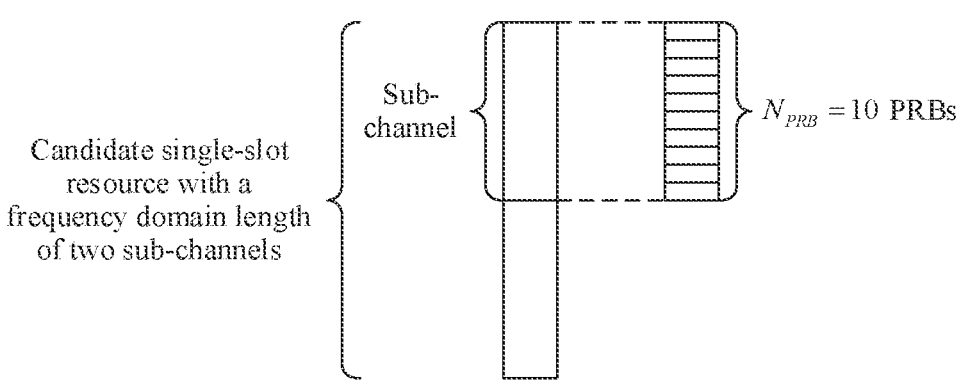
FIG. 2 is a schematic diagram of a structure of a candidate single-slot resource according to an embodiment of this application.

The candidate single-slot resource is a set of sub-channels whose frequency domain lengths are $L_{subCH}$ contiguous sub-channels in a single slot. $L_{subCH}$ is a higher layer parameter provided by the higher layer of the terminal device in a slot (for example, the slot n in FIG. 1) in which resource selection is triggered, and $L_{subCH}$ is a positive integer. The sub-channel is a set of PRBs including $N_{PRB}$ contiguous physical resource blocks (physical resource blocks, PRBs). $N_{PRB}$ is a higher layer configuration parameter of a resource pool, and $N_{PRB}$ is a positive integer. For example, $L_{subCH}=2$ and $N_{PRB}=10$, and FIG. 2 is a schematic diagram of a candidate single-slot resource.

Figure 3:
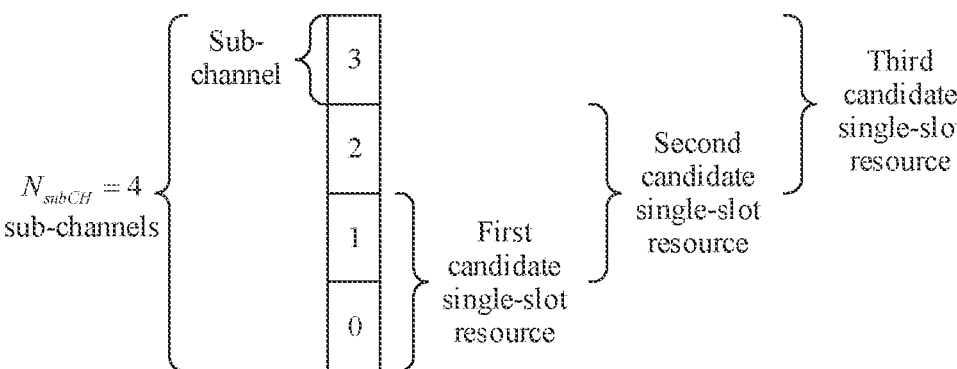
FIG. 3 is a schematic diagram of a relationship between a resource pool and a maximum candidate single-slot resource according to an embodiment of this application.

In addition, one resource pool includes $N_{subCH}$ contiguous sub-channels in frequency domain, and $N_{subCH}$ is a higher layer configuration parameter of the resource pool. Therefore, it can be learned that a maximum number of candidate single-slot resources in a single slot of the resource pool is $N_{subCH}-L_{subCH}+1$. If $N_{subCH}=4$ and $L_{subCH}=2$, the maximum number of candidate single-slot sub-resources is $N_{subCH}-L_{subCH}+1=3$. For example, as shown in FIG. 3, a first candidate single-slot resource includes two sub-channels numbered 0 and 1, a second candidate single-slot resource includes two sub-channels numbered 1 and 2, and a third candidate single-slot resource includes two sub-channels numbered 2 and 3.

In addition, the terminal device may determine, based on a higher layer parameter, one or more resource pools used for SL transmission by the terminal device. The higher layer parameter may be a preconfigured parameter of the terminal device, or may be a configuration parameter from a network device. Different resource pools may be distinguished by different resource pool identifiers.

Based on the foregoing descriptions, a basic procedure in the case of the resource allocation mode 2(a) may be summarized as the following steps.

Step 1: In the slot n, the higher layer of the terminal device triggers time-frequency resource selection for one sending of the PSCCH and/or the PSSCH, and provides the higher layer parameter.

Optionally, the higher layer parameter includes an identifier of a resource pool for sending the PSCCH and/or PSSCH, a sending priority of the one sending of the PSCCH and/or the PSSCH, a number of sub-channels for sending the PSCCH and/or the PSSCH, and the like.

Step 2: The terminal device listens to, in the sensing window, sidelink control information (sidelink control information, SCI) sent by another terminal device that uses the resource pool indicated in step 1.

Step 3: The terminal device senses, based on a listening result in step 2, usage of a time-frequency resource in the selection window in the resource pool, and determines a set of available candidate single-slot resources, where the set of available candidate single-slot resources does not include a time-frequency resource that is reserved by another terminal device or that may be occupied by another terminal device.

Step 4: The terminal device determines, based on the set of available candidate single-slot resources, a time-frequency resource for sending the PSCCH and/or the PSSCH one time.

Figure 4:
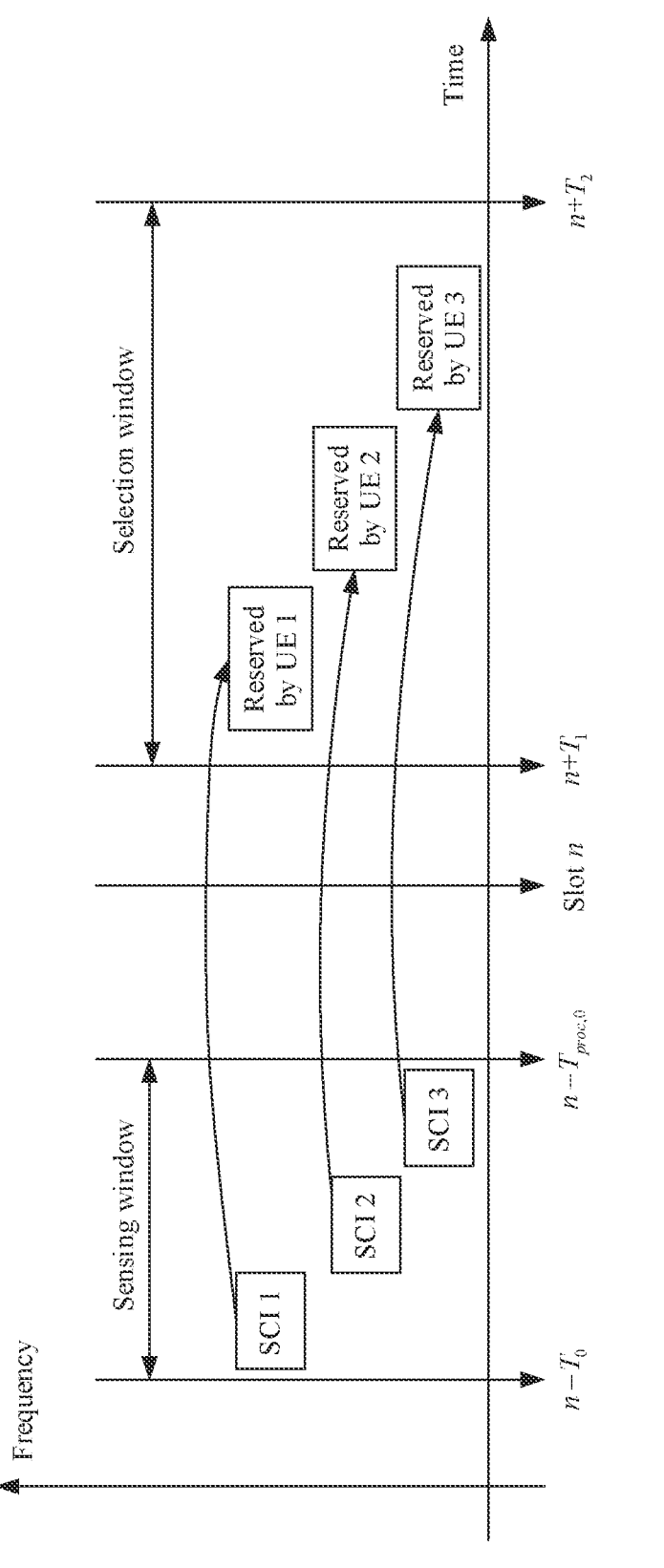
FIG. 4 is a schematic diagram of determining a candidate single-slot resource based on a listening result in a sensing window according to an embodiment of this application.

For example, FIG. 4 is a schematic diagram of determining a candidate single-slot resource by the terminal device based on the listening result in the sensing window in step 3. User equipment (user equipment, UE) 1, UE 2, and UE 3 are terminal devices other than the terminal device. SCI 1 is SCI of UE 1 that is sensed by the terminal device in the sensing window. The SCI 1 indicates that UE 1 reserves some time-frequency resources in the selection window. In this case, the terminal device may exclude the time-frequency resources that have been reserved by UE 1. Similarly, SCI 2 is SCI of UE 2, and SCI 3 is SCI of UE 3. The terminal device may separately exclude, based on the SCI 2 and the SCI 3, time-frequency resources that have been reserved by UE 2 and UE 3, to determine the set of available candidate single-slot resources.

3. Hidden Node and Exposed Node

In the foregoing mode 2(a), there are a hidden node problem and an exposed node problem.

If a terminal device 1 cannot learn of usage and reservation status of a time-frequency resource of a terminal device 2 in mode 2(a), the terminal device 2 is referred to as a hidden node of the terminal device 1.

Figure 5:
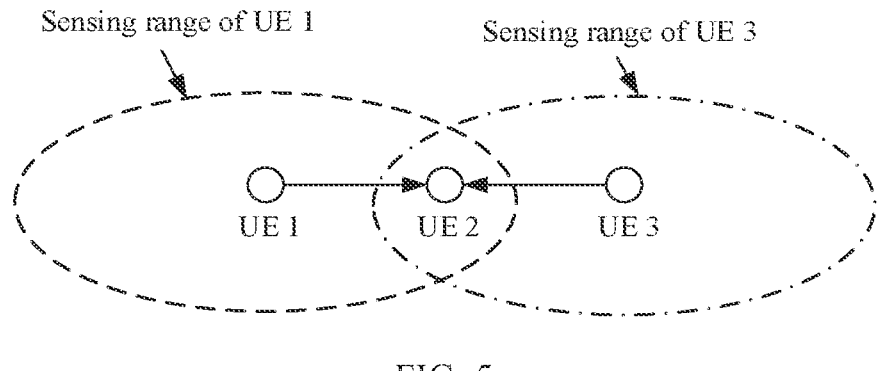
FIG. 5 is a schematic diagram of a hidden node according to an embodiment of this application.

For example, as shown in FIG. 5, UE 1, UE 2, and UE 3 all operate in mode 2(a), both UE 1 and UE 3 have data destined for UE 2, as illustrated by black arrows. Sensing ranges of UE 1 and UE 3 are respectively delimited by two corresponding dashed-line boxes. Because UE 3 is beyond the sensing range of UE 1, UE 1 cannot learn of a usage and reservation status of a time-frequency resource of UE 3 through sensing, and UE 3 is a hidden node of UE 1. Similarly. UE 1 is also a hidden node of UE 3. When UE 1 selects, based on a sensing result, an SL time-frequency resource to send data to UE 2, because UE 1 does not learn of the usage and reservation status of the time-frequency resource of UE 3, UE 1 may select a same time-frequency resource as UE 3. Therefore, when receiving data, UE 2 cannot distinguish the data of UE 1 from the data of UE 3. This causes a collision and mutual interference. Consequently, data transmission from UE 1 and UE 3 to UE 2 may fail.

If a terminal device 1 can learn of a usage and reservation status of a time-frequency resource of a terminal device 2 in mode 2(a), but SL transmission of the terminal device 2 does not cause strong interference to SL transmission of the terminal device 1, to be specific, SL transmission of the terminal device 1 is not affected, the terminal device 2 is referred to as an exposed node of the terminal device 1.

Figure 6:
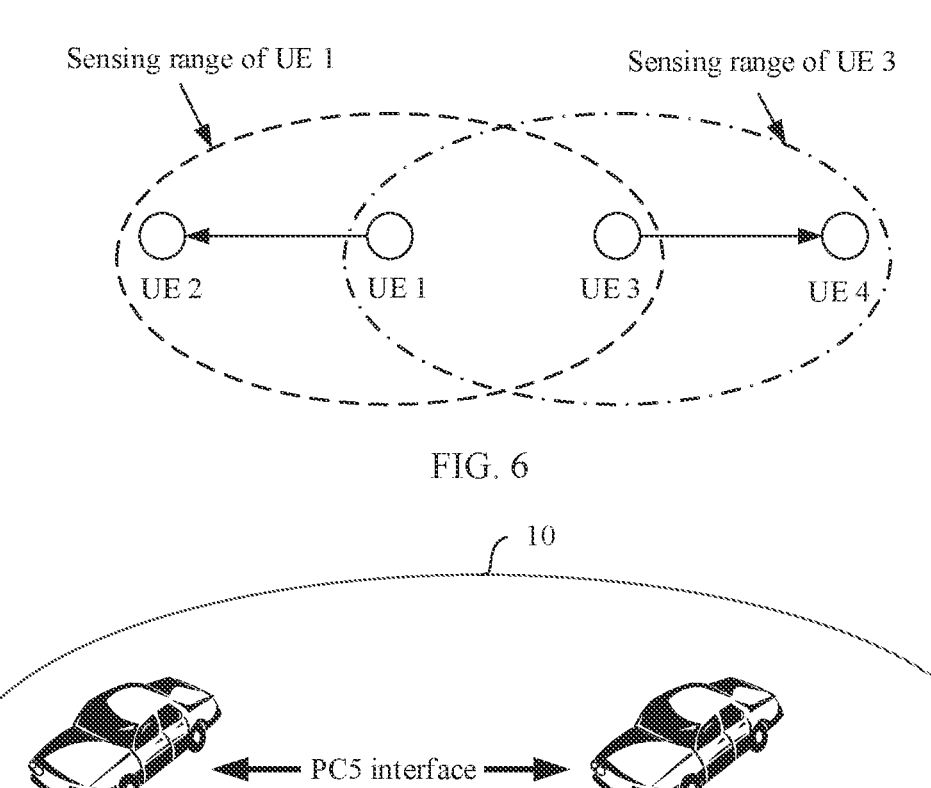
FIG. 6 is a schematic diagram of an exposed node according to an embodiment of this application.

For example, as shown in FIG. 6, UE 1, UE 2, UE 3, and UE 4 all operate in mode 2(a), UE 1 has data destined for UE 2, and UE 3 has data destined for UE 4, as illustrated by black arrows. Sensing ranges of UE 1 and UE 3 are respectively delimited by two corresponding dashed-line boxes. Because UE 3 is within the sensing range of UE 1, UE 1 may learn of a usage and reservation status of a time-frequency resource of UE 3 through sensing. However, because SL transmission of UE 3 is transmission between UE 3 and UE 4, SL transmission from UE 1 to UE 2 is not affected. UE 3 is an exposed node of UE 1. Similarly, UE 1 is an exposed node of UE 3. When performing sensing, UE 1 excludes an SL time-frequency resource reserved by UE 3. However, because a receiver of SL transmission of UE 1 is different from a receiver of SL transmission of UE 3, UE 1 may actually use the SL time-frequency resource reserved by UE 3. In other words, when UE 1 performs SL transmission, excluding the SL time-frequency resource reserved by UE 3 reduces resource utilization.

The following describes the technical solutions in embodiments of this application with reference to the accompanying drawings in embodiments of this application. In the descriptions of this application, unless otherwise specified, "/" indicates an "or" relationship between associated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A or B may be singular or plural. In addition, in the descriptions of this application, unless otherwise specified, "at least one" means one or more, and "a plurality of" means two or more. At least one of the following items (pieces) or a similar expression thereof refers to any combination of these items, including any combination of singular items (pieces) or plural items (pieces). For example, at least one of a, b, or c may represent a, b, c, a-b, a-c, b-c, or a-b-c, where "-" indicates that associated objects are in an "and" relationship, and a, b, or c may be singular or plural. In addition, to clearly describe the technical solutions in embodiments of this application, terms such as "first" and "second" are used in embodiments of this application to distinguish between same items or similar items that have basically same functions and purposes. A person skilled in the art may understand that the terms such as "first" and "second" do not limit a number or an execution sequence, and that the terms such as "first" and "second" do not indicate a definite difference.

The technical solutions in embodiments of this application may be applied to various communication systems, for example, a 5th generation (5th generation, 5G) communication system and another system. Terms "system" and "network" can be interchanged with each other. The 5G communication system is a next generation communication system under research. The 5G communication system includes a 5G non-standalone (non-standalone, NSA) mobile communication system, a 5G standalone (standalone, SA) mobile communication system, or both a 5G NSA mobile communication system and a 5G SA mobile communication system. In addition, the communication systems may be further used in future-oriented communication technologies, and are all used in the technical solutions provided in embodiments of this application. The foregoing communication systems used in this application are merely examples for description, and communication systems used in this application are not limited thereto. A general description is provided herein. Details are not described below again.

In addition, the technical solutions provided in embodiments of this application may be applied to a cellular link, or may be applied to a link between devices, for example, a device-to-device (device to device, D2D) link or a vehicle-to-everything (vehicle to everything, V2X) link. The D2D link or the V2X link may alternatively be referred to as a sidelink, a secondary link, or the like. In embodiments of this application, the D2D link, the V2X link, the secondary link, or the sidelink is a link established between devices of a same type, and meanings of these links are the same. The link established between devices of a same type may be a link between terminal devices, a link between relay nodes, or the like. This is not limited in embodiments of this application. For the link between the terminal devices, there is a D2D link defined in 3GPP Release (Rel)-12/13, and there is also a V2X link, defined by 3GPP for the internet of vehicles, between vehicles, a vehicle and a mobile phone, or a vehicle and any entity. The V2X link includes a V2X link in Rel-14/15, and further includes, for example, an NR-system-based V2X link in Rel-16 and subsequent releases which are currently being researched by 3GPP.

Figure 7:
FIG. 7 is a schematic diagram of a structure of a communication system according to an embodiment of this application.

FIG. 7 shows a communication system 10 according to an embodiment of this application. The communication system 10 includes a first terminal device 20 and a second terminal device 30. The first terminal device 20 may directly communicate with the second terminal device 30 through a PC5 interface. A direct communication link between the first terminal device 20 and the second terminal device 30 is an SL.

Communication between the first terminal device and the second terminal device shown in FIG. 7 is used as an example. In this embodiment of this application, the first terminal device determines X sets of candidate single-time-unit resources based on a first number of sub-channels, and determines first information based on the X sets of candidate single-time-unit resources. The first number of sub-channels is a number of sub-channels to be used by the second terminal device for PSSCH and/or PSCCH transmission. Different sets of candidate single-time-unit resources correspond to different selection windows. Each of the X sets of candidate single-time-unit resources includes one or more candidate single-time-unit resources. The candidate single-time-unit resource includes one time unit in time domain and one or more contiguous sub-channels in frequency domain. The first information indicates K candidate single-time-unit resources, the K candidate single-time-unit resources are a part of or all candidate single-time-unit resources whose time domain locations are in a first time window in the X sets of candidate single-time-unit resources, the first time window is a time window included in a selection window corresponding to at least one of the X sets of candidate single-time-unit resources, and X and K are positive integers. After determining the first information, the first terminal device sends the first information to the second terminal device. Correspondingly, after receiving the first information from the first terminal device, the second terminal device determines a first time-frequency resource based on the first information. The first time-frequency resource is for PSSCH and/or PSCCH transmission.

Based on this solution, the first terminal device serves as a data receiver of the second terminal device, and the X sets of candidate single-time-unit resources determined by the first terminal device may not include time-frequency resources that have been used and reserved by a hidden node of the second terminal device. Therefore, when determining a time-frequency resource based on the first information after receiving the first information, the second terminal device cannot select a resource that is the same as that of the hidden node of the second terminal device. This avoids collision and reduces interference between terminal devices. Alternatively, the first terminal device serves as a data receiver of the second terminal device, and the X sets of candidate single-time-unit resources determined by the first terminal device may include time-frequency resources that have been used and reserved by an exposed node of the second terminal device. Therefore, when determining a time-frequency resource based on the first information after receiving the first information, the second terminal device may select a time-frequency resource reserved by the exposed node of the second terminal device. This improves resource utilization.

Optionally, the terminal device (including the first terminal device and the second terminal device) in embodiments of this application is a device configured to implement a wireless communication function, for example, a terminal or a chip that can be used in the terminal. The terminal may be user equipment (user equipment, UE), an access terminal, a terminal unit, a terminal station, a mobile station, a remote station, a remote terminal, a mobile device, a wireless communication device, a terminal agent, a terminal apparatus, or the like in the 5G network or a future evolved PLMN. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device or another processing device connected to a wireless modem, a vehicle-mounted device, a wearable device, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (telemedicine), a wireless terminal in a smart grid (smart grid), a wireless terminal in transportation safety (transportation safety), a wireless terminal in a smart city (smart city), a wireless terminal in a smart home (smart home), or the like. The terminal may be mobile or fixed. The terminal device in embodiments of this application may alternatively be a vehicle-mounted module, a vehicle-mounted module assembly, a vehicle-mounted component, a vehicle-mounted chip, or a vehicle-mounted unit that is built in a vehicle as one or more components or units. The vehicle may use the vehicle-mounted module, the vehicle-mounted module assembly, the vehicle-mounted component, the vehicle-mounted chip, or the vehicle-mounted unit that is built in the vehicle to implement the method in this application.

Optionally, the terminal device (including the first terminal device 20 and the second terminal device 30) in embodiments of this application may alternatively be referred to as a communication apparatus, and may be a general-purpose device or a dedicated device. This is not specifically limited in embodiments of this application.

Figure 8:
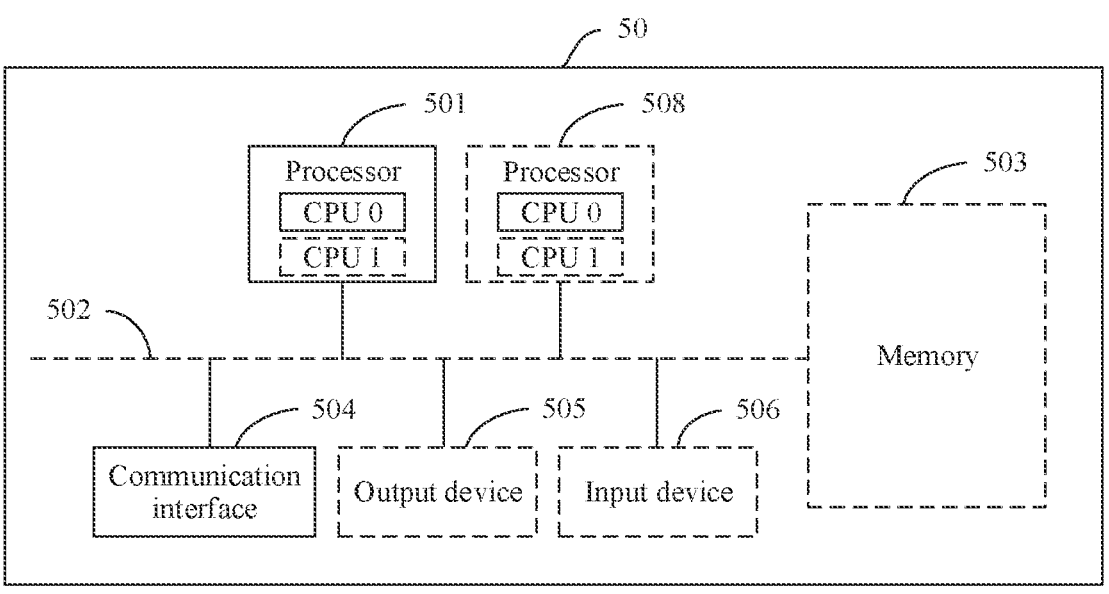
FIG. 8 is a schematic diagram of a structure of a communication apparatus according to an embodiment of this application.

Optionally, in this embodiment of this application, the first terminal device 20 and the second terminal device 30 in FIG. 7 may be implemented by using a communication device (or a communication apparatus) 50 in FIG. 8. FIG. 8 is a schematic diagram of a structure of the communication device 50 according to an embodiment of this application. The communication device 50 includes one or more processors 501 and at least one communication interface (where FIG. 8 is merely an example in which a communication interface 504 and one processor 501 are included for description), and optionally may further include a memory 503 and a communication bus 502.

Optionally, the processor 501, the communication interface 504, or the memory 503 may be coupled together (not shown in FIG. 8), or as shown in FIG. 8, may be connected together through the communication bus 502.

The processor 501 may be a general-purpose central processing unit (central processing unit, CPU), a microprocessor, an application-specific integrated circuit (application-specific integrated circuit, ASIC), or one or more integrated circuits configured to control program execution of the solutions of this application.

The communication bus 502 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one thick dashed line is used to represent the bus in FIG. 8, but this does not indicate that there is only one bus or only one type of bus. The communication bus 502 may be configured to connect different components in the communication device 50, so that the different components can communicate with each other.

The communication interface 504 may be a transceiver module, configured to communicate with another device or a communication network, for example, the Ethernet, a radio access network (radio access network, RAN), or a wireless local area network (wireless local area network, WLAN). For example, the transceiver module may be an apparatus such as a transceiver or a transceiver machine. Optionally, the communication interface 504 may alternatively be a transceiver circuit located inside the processor 501, and is configured to implement signal input and signal output of the processor.

The memory 503 may be an apparatus having a storage function. For example, the memory 503 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory 503 is not limited thereto. The memory may exist independently, and connect to the processor through the communication line 502. The memory may alternatively be integrated with the processor.

The memory 503 is configured to store computer instructions for performing the solutions of this application, and the processor 501 controls execution of the computer instructions. The processor 501 is configured to execute the computer instructions stored in the memory 503, to implement the method provided in embodiments of this application.

Alternatively, optionally, in this embodiment of this application, the processor 501 may perform processing-related functions in a method provided in the following embodiments of this application, and the communication interface 504 is responsible for communication with another device or a communication network. This is not specifically limited in this embodiment of this application.

Optionally, the computer instructions in this embodiment of this application may also be referred to as application program code. This is not specifically limited in this embodiment of this application.

During specific implementation, in an embodiment, the processor 501 may include one or more CPUs, for example, a CPU 0 and a CPU 1 in FIG. 8.

During specific implementation, in an embodiment, the communication device 50 may include a plurality of processors, for example, the processor 501 and a processor 508 in FIG. 8. Each of the processors may be a single-CPU (single-CPU) processor, or may be a multi-CPU (multi-CPU) processor. The processor herein may be one or more devices, circuits, and/or processing cores configured to process data (for example, computer program instructions).

During specific implementation, in an embodiment, the communication device 50 may further include an output device 505 and an input device 506. The output device 505 communicates with the processor 501, and may display information in a plurality of manners. For example, the output device 505 may be a liquid crystal display (liquid crystal display. LCD), a light emitting diode (light emitting diode, LED) display device, a cathode ray tube (cathode ray tube, CRT) display device, a projector (projector), or the like. The input device 506 communicates with the processor 501, and may receive user input in a plurality of manners. For example, the input device 506 may be a mouse, a keyboard, a touchscreen device, or a sensor device.

It may be understood that the structure shown in FIG. 8 does not constitute a specific limitation on a terminal device.

For example, in some other embodiments of this application, the terminal device may include more or fewer components than those shown in the figure, some components may be combined, some components may be split, or the components may be differently arranged. The components shown in the figure may be implemented by hardware, software, or a combination of software and hardware.

With reference to the accompanying drawings, the following describes in detail the resource indication information transmission method provided in embodiments of this application by using an example in which the first terminal device 20 and the second terminal device 30 shown in FIG. 7 interact with each other, the first terminal device serves as a data receive end, and the second terminal device serves as a data transmit end.

It should be noted that names of messages between network elements, names of parameters in the messages, or the like in the following embodiments of this application are merely examples, and there may be other names in a specific implementation. This is not specifically limited in embodiments of this application.

Figure 9:
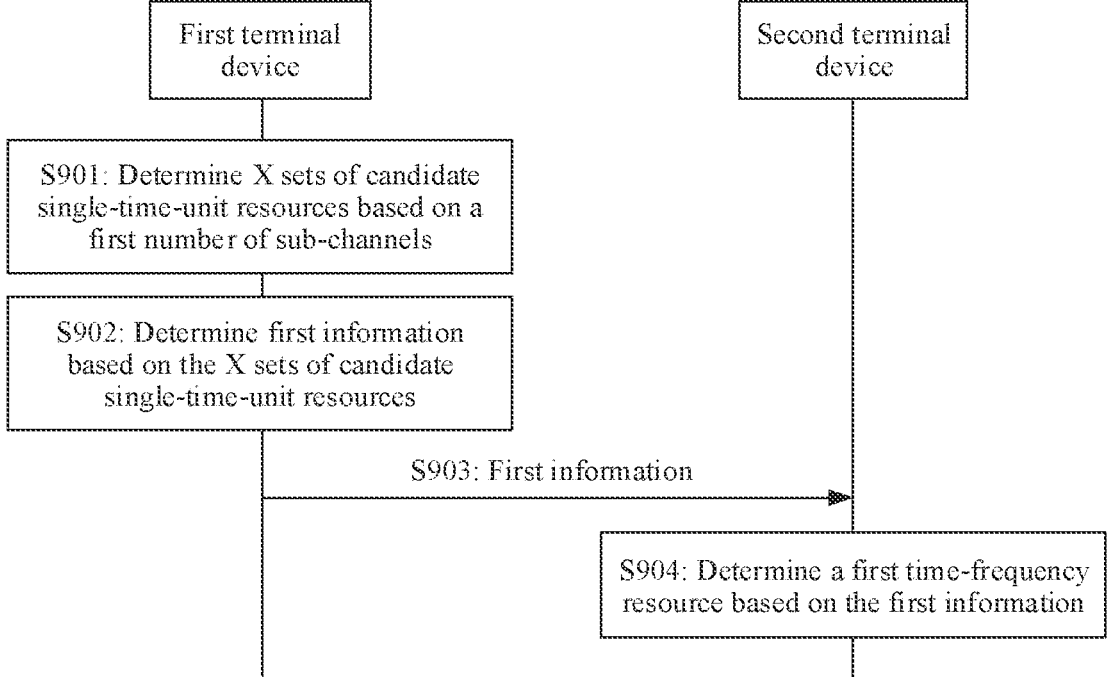
FIG. 9 is a schematic flowchart of a resource indication information transmission method according to an embodiment of this application.

FIG. 9 shows a resource indication information transmission method according to an embodiment of this application. The resource indication information transmission method includes the following steps.

S901: A first terminal device determines X sets of candidate single-time-unit resources based on a first number of sub-channels.

The first number of sub-channels is a number of sub-channels to be used by a second terminal device for PSSCH and/or PSCCH transmission.

X is a positive integer, to be specific, X may be 1. Different sets of candidate single-time-unit resources in the X sets of candidate single-time-unit resources correspond to different selection windows. Each of the X sets of candidate single-time-unit resources includes one or more candidate single-time-unit resources, and quantities of candidate single-time-unit resources included in different sets of candidate single-time-unit resources may be the same or may be different. The candidate single-time-unit resource includes one time unit in time domain and one or more contiguous sub-channels in frequency domain.

It should be noted that, in this embodiment of this application, the time unit may be one of an OFDM symbol, a mini-slot, a slot, a subframe, a frame, or a minimum scheduling unit in time domain.

It should be noted that, in this embodiment of this application, the candidate single-time-unit resource may alternatively include one or more contiguous PRBs, one or more contiguous subcarriers, or one or more contiguous minimum scheduling units in frequency domain. To be specific, the candidate single-time-unit resource includes one time unit in time domain and one or more contiguous sub-channels in frequency domain; or the candidate single-time-unit resource includes one time unit in time domain and one or more contiguous PRBs in frequency domain; or the candidate single-time-unit resource includes one time unit in time domain and one or more contiguous minimum scheduling units in frequency domain. The following embodiments of this application are described by using an example in which the candidate single-time-unit resource includes one time unit in time domain and one or more contiguous sub-channels in frequency domain.

It may be understood that the candidate single-time-unit resource included in the X sets of candidate single-time-unit resources that are determined by the first terminal device based on the first number of sub-channels includes one time unit in time domain, and a number of sub-channels included in the candidate single-time-unit resource in frequency domain is the first number of sub-channels.

Optionally, the first number of sub-channels may be sent by the second terminal device to the first terminal device, or may be determined by the first terminal device, or may be specified in a protocol. This is not specifically limited in this embodiment of this application.

Optionally, that a first terminal device determines X sets of candidate single-time-unit resources based on a first number of sub-channels may include: The first terminal device determines the X sets of candidate single-time-unit resources through sensing based on the first number of sub-channels. To be specific, the first terminal device determines the X sets of candidate single-time-unit resources in a resource allocation mode 2(a) based on the first number of sub-channels.

Correspondingly, each of the X sets of candidate single-time-unit resources corresponds to one time unit, one sensing window, and one selection window. Different sets of candidate single-time-unit resources correspond to different time units, different sensing windows, and different selection windows. One or more candidate single-time-unit resources included in each set of candidate single-time-unit resources are located in a selection window corresponding to the set of candidate single-time-unit resources.

Optionally, the first terminal device may determine the X sets of candidate single-time-unit resources through sensing based on the first number of sub-channels and a first parameter set. The first parameter set may include a first resource pool identifier and/or a first priority. The parameters are described as follows.

The first resource pool identifier is an identifier of a first resource pool used by the second terminal device for PSSCH and/or PSCCH transmission. In other words, the first terminal device may determine, based on the first resource pool identifier, a resource pool to which the candidate single-time-unit resource included in the X sets of candidate single-time-unit resources belongs. In the following embodiments of this application, an example in which the candidate single-time-unit resource included in the X sets of candidate single-time-unit resources belongs to the first resource pool is used for description. It may be understood that the first resource pool is also a resource pool used by the first terminal device to receive the PSSCH and/or the PSCCH from the second terminal device.

The first priority is a priority used by the second terminal device for PSSCH and/or PSCCH transmission. The first terminal device may determine, based on the first priority, a candidate single-time-unit resource specifically included in the X sets of candidate single-time-unit resources. For example, if a candidate single-time-unit resource in a candidate time window is occupied by another terminal device, but a service priority of the another terminal device is lower than the first priority, the first terminal device may still determine that the candidate single-time-unit resource is available, that is, determine that a set of candidate single-time-unit resources corresponding to the candidate time window includes the occupied candidate single-time-unit resource.

Optionally, the first parameter set may be sent by the second terminal device to the first terminal device, or may be determined by the first terminal device, or may be specified in a protocol. This is not specifically limited in this embodiment of this application.

Optionally, in this embodiment of this application, an example in which sets of candidate single-time-unit resources in the X sets of candidate single-time-unit resources are arranged from front to back based on a sequence of time units corresponding to the sets of candidate single-time-unit resources is used for description. In this case, a time unit corresponding to the last set of candidate single-time-unit resources in the X sets of candidate single-time-unit resources is not later than a time unit m. The time unit m is a time unit in which the first terminal device sends first information. The first information is described in detail in a subsequent embodiment, and details are not described herein.

Figure 10:
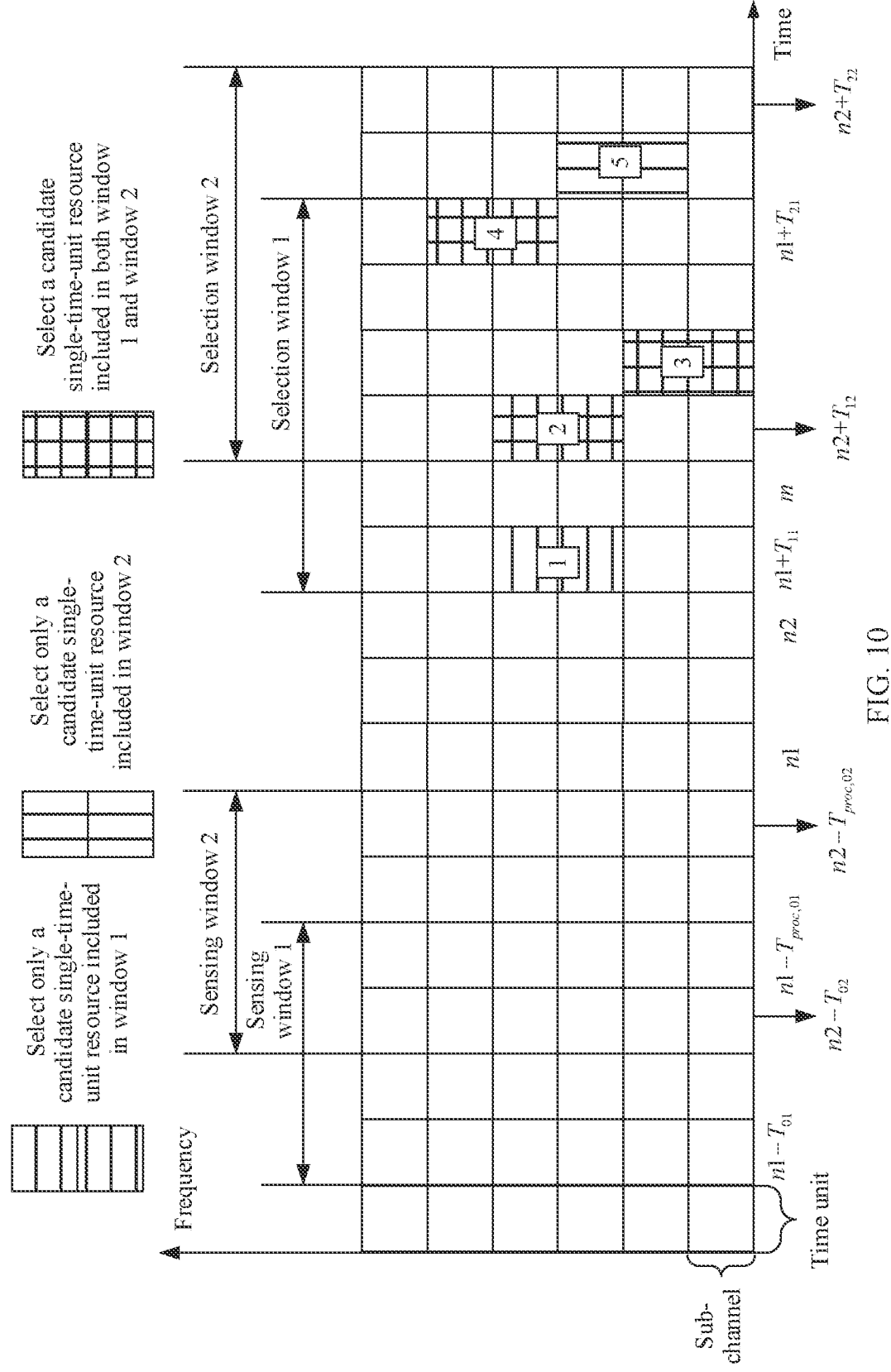
FIG. 10 is a schematic diagram of a set of candidate single-time-unit resources according to an embodiment of this application.

For example, X is equal to 2, and the first number of sub-channels is equal to 2. As shown in FIG. 10, a time unit corresponding to the $1^{st}$ set of candidate single-time-unit resources is a time unit n1, a start time unit of a corresponding sensing window 1 is $n1-T_{01}$, an end time unit is $n1-T_{proc,01}$, a start time unit of a corresponding selection window 1 is $n1+T_{11}$, and an end time unit is $n1+T_{21}$. The $1^{st}$ set of candidate single-time-unit resources includes four candidate single-time-unit resources in total: a resource 1, a resource 2, a resource 3, and a resource 4. A time unit corresponding to the $2^{nd}$ set of candidate single-time-unit resources is a time unit n2, a start time unit of a corresponding sensing window 2 is $n2-T_{02}$, an end time unit is $n2-T_{proc,02}$, a start time unit of a corresponding selection window 2 is $n2+T_{12}$, and an end time unit is $n2+T_{22}$. The $2^{nd}$ set of candidate single-time-unit resources includes four candidate single-time-unit resources in total: the resource 2, the resource 3, the resource 4, and a resource 5.

S902: The first terminal device determines the first information based on the X sets of candidate single-time-unit resources.

The first information indicates K candidate single-time-unit resources, the K candidate single-time-unit resources are K candidate single-time-unit resources whose time domain locations are in a first time window in the X sets of candidate single-time-unit resources. The first time window is a time window included in a selection window corresponding to at least one of the X sets of candidate single-time-unit resources. A number of candidate single-time-unit resources whose time domain locations are in the first time window in the X sets of candidate single-time-unit resources is greater than or equal to K. In other words, the K candidate single-time-unit resources are a part of or all candidate single-time-unit resources whose time domain locations are in the first time window in the X sets of candidate single-time-unit resources, and K is a positive integer.

Optionally, when X is 1, the first time window is a time window included in a selection window corresponding to the one set of candidate single-time-unit resources, and the K candidate single-time-unit resources indicated by the first information are a part of or all candidate single-time-unit resources whose time domain locations are in the first time window in the one set of candidate single-time-unit resources.

Optionally, a start time unit of the first time window is a time unit after the time unit m. The time unit m is a time unit in which the first terminal device sends the first information.

Optionally, a number of time units between the start time unit of the first time window and the time unit m may be T. In other words, the start time unit of the first time window may be a time unit m+T+1. A length of the first time window may be Y time units. To be specific, the start time unit of the first time window is the time unit m+T+1, and an end time unit of the first time window is a time unit m+T+Y, where T is a natural number, and Y is a positive integer.

Figure 11:
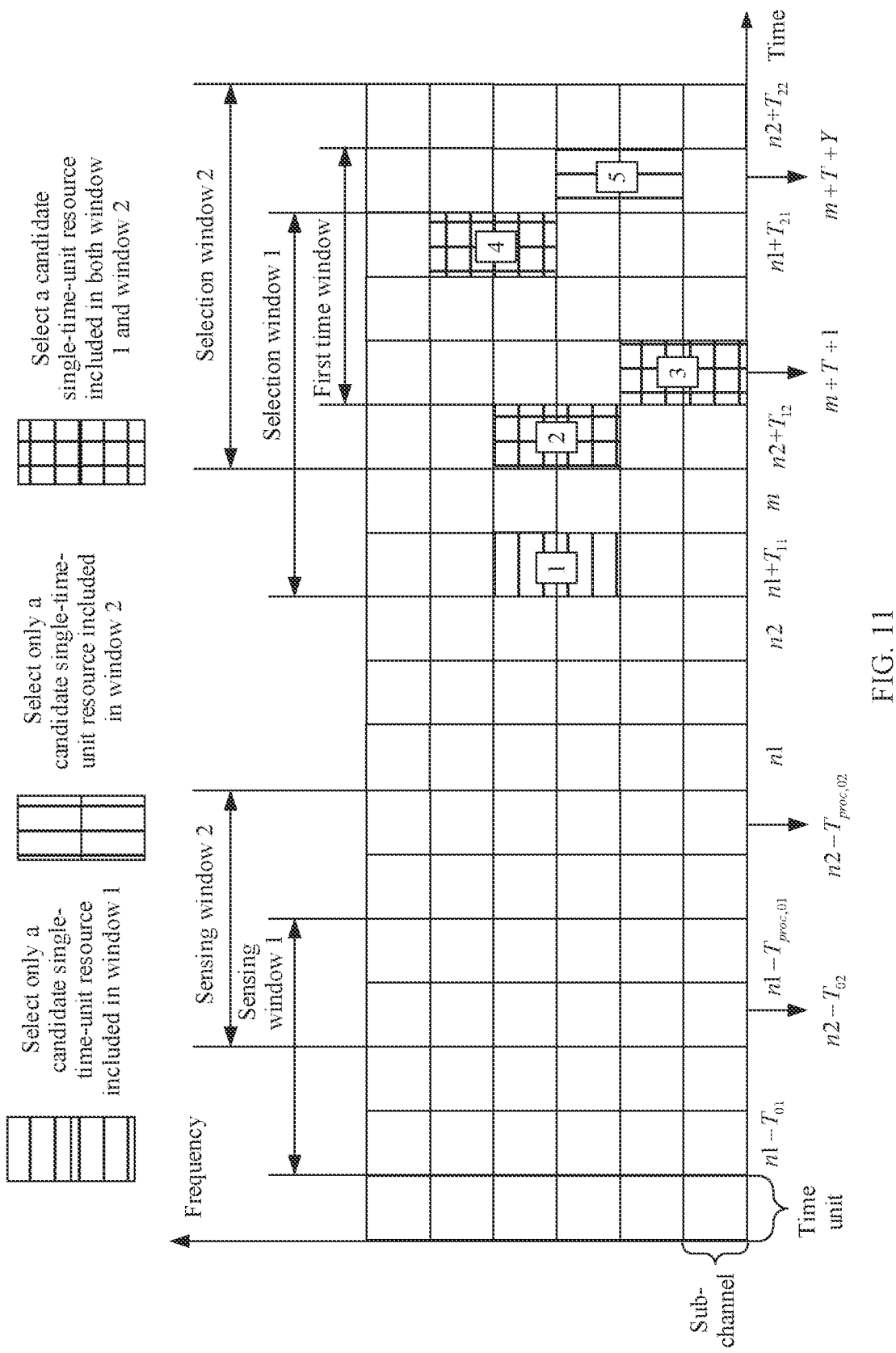
FIG. 11 is a schematic diagram of a first time window according to an embodiment of this application.

For example, based on the example shown in FIG. 10, as shown in FIG. 11, if the first time window is a time window included in the selection window corresponding to the $2^{nd}$ set of candidate single-time-unit resources, the K candidate single-time-unit resources are K candidate single-time-unit resources whose time domain locations are in the first time window in the resource 3, the resource 4, and the resource 5. In this case, K is a positive integer less than or equal to 3.

Optionally, that the K candidate single-time-unit resources are K candidate single-time-unit resources whose time domain locations are in a first time window in the X sets of candidate single-time-unit resources may include: The K candidate single-time-unit resources are K candidate single-time-unit resources whose time domain locations are in the first time window in an intersection set of the X sets of candidate single-time-unit resources. For example, based on the example shown in FIG. 11, an intersection set between the $1^{st}$ set of candidate single-time-unit resources and the $2^{nd}$ set of candidate single-time-unit resources includes the resource 2, the resource 3, and the resource 4. In this case, the K candidate single-time-unit resources are K candidate single-time-unit resources whose time domain locations are in the first time window in the resource 3 and the resource 4. In this case, K is a positive integer less than or equal to 2.

Optionally, that the K candidate single-time-unit resources are K candidate single-time-unit resources whose time domain locations are in a first time window in the X sets of candidate single-time-unit resources may include: The K candidate single-time-unit resources are K candidate single-time-unit resources whose time domain locations are in the first time window in a union set of the X sets of candidate single-time-unit resources. For example, based on the example shown in FIG. 11, a union set of the $1^{st}$ set of candidate single-time-unit resources and the $2^{nd}$ set of candidate single-time-unit resources includes the resource 1, the resource 2, the resource 3, the resource 4, and the resource 5. In this case, the K candidate single-time-unit resources are K candidate single-time-unit resources whose time domain locations are in the first time window in the resource 3, the resource 4, and the resource 5. In this case, K is a positive integer less than or equal to 3.

Optionally, the first terminal device may determine, according to the following method, the K candidate single-time-unit resources indicated by the first information.

1. One or more initial candidate single-time-unit resources are determined.

Optionally, the one or more initial candidate single-time-unit resources may include all candidate single-time-unit resources whose time domain locations are in the first time window in the $1^{st}$ set of candidate single-time-unit resources (where a time unit corresponding to the $1^{st}$ set of candidate single-time-unit resources is the smallest) of the X sets of candidate single-time-unit resources.

2. Whether each initial candidate single-time-unit resource is included in the K candidate single-time-unit resources indicated by the first information is determined according to a specific rule.

Optionally, the specific rule may include the following two types.

Rule 1: If the $i^{th}$ set of candidate single-time-unit resources in the X sets of candidate single-time-unit resources includes a first initial candidate single-time-unit resource, but the $j^{th}$ set of candidate single-time-unit resources in the X sets of candidate single-time-unit resources does not include the first initial candidate singletime-unit resource, the K candidate single-time-unit resources indicated by the first information does not include the first initial candidate single-time-unit resource.

The first initial candidate single-time-unit resource is any one of the foregoing one or more initial candidate single-time-unit resources, i is a positive integer greater than 1, and j is a positive integer greater than i and less than or equal to X.

In other words, if the first terminal device determines, in time units corresponding to the $i^{th}$ set of candidate single-time-unit resources, that the first initial candidate single-time-unit resource is available, and determines, in time units corresponding to the $j^{th}$ set of candidate single-time-unit resources, that the first initial candidate single-time-unit resource is unavailable, the K candidate single-time-unit resources indicated by the first information do not include the first initial candidate single-time-unit resource. A reason why this case occurs may be that another terminal device reserves the first initial candidate single-time-unit resource.

For example, the first initial candidate single-time-unit resource is the resource 1, and X is equal to 5. If the $2^{nd}$ set of candidate single-time-unit resources in the five sets of candidate single-time-unit resources includes the resource 1, but the $3^{rd}$ set of candidate single-time-unit resources does not include the resource 1, regardless of whether the $4^{th}$ set of candidate single-time-unit resources or the $5^{th}$ set of candidate single-time-unit resources includes the resource 1, the K candidate single-time-unit resources indicated by the first information do not include the resource 1.

Rule 2: If the $i^{th}$ set of candidate single-time-unit resources in the X sets of candidate single-time-unit resources does not include a first initial candidate single-time-unit resource, but the $j^{th}$ set of candidate single-time-unit resources in the X sets of candidate single-time-unit resources includes the first initial candidate single-time-unit resource, the K candidate single-time-unit resources indicated by the first information include the first initial candidate single-time-unit resource.

In other words, if the first terminal device determines, in time units corresponding to the $i^{th}$ set of candidate single-time-unit resources, that the first initial candidate single-time-unit resource is unavailable, and determines, in time units corresponding to the $j^{th}$ set of candidate single-time-unit resources, that the first initial candidate single-time-unit resource is available, the K candidate single-time-unit resources indicated by the first information include the first initial candidate single-time-unit resource. A reason why this case occurs may be that another terminal device releases the first initial candidate single-time-unit resource that is previously reserved.

For example, the first initial candidate single-time-unit resource is the resource 1, and X is equal to 5. If the $2^{nd}$ set of candidate single-time-unit resources in the five sets of candidate single-time-unit resources does not include the resource 1, but the $3^{rd}$ set of candidate single-time-unit resources includes the resource 1, regardless of whether the $4^{th}$ set of candidate single-time-unit resources or the $5^{th}$ set of candidate single-time-unit resources includes the resource 1, the K candidate single-time-unit resources indicated by the first information include the resource 1.

Optionally, the first terminal device may alternatively determine, according to the foregoing rule 1 and rule 2, the K candidate single-time-unit resources indicated by the first indication information.

For example, the first initial candidate single-time-unit resource is the resource 1, and X is equal to 5. If the $2^{nd}$ set of candidate single-time-unit resources in the five sets of candidate single-time-unit resources includes the resource 1, but the $3^{rd}$ set of candidate single-time-unit resources does not include the resource 1, the first terminal device may determine, according to the rule 1, that the K candidate single-time-unit resources indicated by the first information do not include the resource 1. Subsequently, if the $4^{th}$ set of candidate single-time-unit resources includes the resource 1, the first terminal device may determine, according to the rule 2, that the K candidate single-time-unit resources indicated by the first information include the resource 1. The rest may be deduced by analogy.

S903: The first terminal device sends the first information to the second terminal device. Correspondingly, the second terminal device receives the first information from the first terminal device.

Optionally, the first terminal device sends the first information to the second terminal device in the time unit m. Correspondingly, the second terminal device receives the first information from the first terminal device in the time unit m.

Optionally, the time unit m may be a start time unit in a time-frequency resource that is scheduled by a network device for the first terminal device and that is for SL transmission. Alternatively, the time unit m may be a time unit in a candidate single-time-unit resource that is determined by the first terminal device through sensing based on a second number of sub-channels and that is for sending the first information. To be specific, the candidate single-time-unit resource for sending the first information includes the time unit m in time domain, a number of contiguous sub-channels included by the candidate single-time-unit resource in frequency domain is the second number of sub-channels, and the second number of sub-channels is a number of sub-channels to be used by the first terminal device for PSCCH and/or PSSCH transmission.

Optionally, when the second number of sub-channels is the same as the first number of sub-channels, the first terminal device may determine a candidate single-time-unit resource of the $1^{st}$ set of candidate single-time-unit resources in the X sets of candidate single-time-unit resources as the candidate single-time-unit resource for sending the first information. In other words, the first terminal device no longer needs to determine the time unit m through sensing based on the second number of sub-channels.

Optionally, the first terminal device may send the first information to the second terminal device in a plurality of manners.

In a possible implementation, that the first terminal device sends the first information to the second terminal device may include: The first terminal device sends second-stage SCI to the second terminal device, where the second-stage SCI includes the first information. Correspondingly, that the second terminal device receives the first information from the first terminal device may include: The second terminal device receives the second-stage SCI from the first terminal device.

Based on this solution, because the second-stage SCI is transmitted on a PSSCH, the second-stage SCI has better flexibility than first-stage SCI transmitted on a PSCCH. Therefore, transmitting the first information via the second-stage SCI may improve transmission flexibility of the first information.

In another possible implementation, that the first terminal device sends the first information to the second terminal device may include: The first terminal device sends a medium access control control element (medium access control control element, MAC CE) to the second terminal device, where the MAC CE includes the first information. Correspondingly, that the second terminal device receives the first information from the first terminal device may include: The second terminal device receives the MAC CE from the first terminal device.

In still another possible implementation, that the first terminal device sends the first information to the second terminal device may include: The first terminal device sends radio resource control (radio resource control, RRC) signaling to the second terminal device, where the RRC signaling includes the first information. Correspondingly, that the second terminal device receives the first information from the first terminal device may include: The second terminal device receives the RRC signaling from the first terminal device. It may be understood that the RRC signaling may be PC5-RRC signaling.

Optionally, the first terminal device may send the first information to the second terminal device only in one of the foregoing three manners, for example, send information about the K candidate single-time-unit resources to the second terminal device via the second-stage SCI. Alternatively, the first terminal device may send the first information to the second terminal device by using a combination of a plurality of the foregoing three manners, for example, send information about some of the K candidate single-time-unit resources to the second terminal device via SCI, and send information about the other of the K candidate single-time-unit resources to the second terminal device via a MAC CE.

S904: The second terminal device determines a first time-frequency resource based on the first information.

The first time-frequency resource is for PSSCH and/or PSCCH transmission.

Optionally, the second terminal device may determine the first time-frequency resource based on the first information in a plurality of manners.

In a possible implementation, that the second terminal device determines a first time-frequency resource based on the first information may include: The second terminal device determines the first time-frequency resource based on the first information and a first set of candidate single-time-unit resources, where the first set of candidate single-time-unit resources is a set of candidate single-time-unit resources determined by the second terminal device through sensing.

For example, the first time-frequency resource determined by the second terminal device based on the first information and the first set of candidate single-time-unit resources may include a candidate single-time-unit resource that is not included in the first set of candidate single-time-unit resources but is included in the K candidate single-time-unit resources indicated by the first information. In other words, the second terminal device determines, through sensing, that a candidate single-time-unit resource is unavailable, but the first information indicates the candidate single-time-unit resource, and the second terminal device may determine the candidate single-time-unit resource as a resource included in the first time-frequency resource.

This solution can resolve an exposed node problem in mode 2(a). For example, as shown in FIG. 6, the first terminal device is UE 4, and the second terminal device is UE 3. UE 3 determines, through sensing, that a candidate single-time-unit resource is occupied by UE 1. Therefore, UE 3 determines that the candidate single-time-unit resource is unavailable. However, the first information sent by UE 4 to UE 3 indicates that the candidate single-time-unit resource is available. In this case, UE 3 may determine the candidate single-time-unit resource as a resource included in the first time-frequency resource. A reason why UE 4 determines that the candidate single-time-unit resource is available may be: UE 4 determines that no terminal device occupies or reserves the candidate single-time-unit resource to send data to UE 4, so that UE 3 may send data to UE 4 by using the candidate single-time-unit resource, to improve resource utilization.

Alternatively, for example, the first time-frequency resource determined by the second terminal device based on the first information and the first set of candidate single-time-unit resources does not include a candidate single-time-unit resource that is not included in the K candidate single-time-unit resources indicated by the first information but is included in the first set of candidate single-time-unit resources. In other words, the second terminal device determines, through sensing, that a candidate single-time-unit resource is available, but the first information does not indicate the candidate single-time-unit resource. To be specific, the first terminal device determines that the candidate single-time-unit resource is unavailable, and the second terminal device determines that the first time-frequency resource does not include the candidate time unit resource.

This solution can resolve a hidden node problem in mode 2(a). For example, as shown in FIG. 5, the first terminal device is UE 2, and the second terminal device is UE 3. UE 3 determines, through sensing, that a candidate single-time-unit resource is available. However, the first information sent by UE 2 to UE 3 does not indicate that the candidate single-time-unit resource is unavailable. In this case, UE 3 determines that the first time-frequency resource does not include the candidate single-time-unit resource. A possible cause of this scenario is that UE 1 occupies the candidate single-time-unit resource, UE 1 is beyond a sensing range of UE 3, and UE 3 cannot learn of an occupation status of a time-frequency resource of UE 1 through sensing. When UE 1 sends data to UE 2 by using the candidate single-time-unit resource, because UE 3 determines that the first time-frequency resource does not include the candidate single-time-unit resource, a collision can be avoided, interference can be reduced, and a data transmission success rate can be improved.

In another possible implementation, that the second terminal device determines a first time-frequency resource based on the first information may include: The second terminal device determines, as the first time-frequency resource, a part of or all of the K candidate single-time-unit resources indicated by the first information.

Optionally, this implementation may be applied in a scenario in which the first terminal device is a terminal device having a scheduling capability. To be specific, the first terminal device schedules, for the second terminal device, time-frequency resources for SL transmission.

Optionally, the first terminal device may determine the first time-frequency resource only in one of the foregoing three manners, or may determine the first time-frequency resource by using a combination of a plurality of the foregoing three manners. This is not specifically limited in this embodiment of this application.

Based on this solution, the first terminal device serves as a data receiver of the second terminal device, and the X sets of candidate single-time-unit resources determined by the first terminal device may not include time-frequency resources that have been used and reserved by a hidden node of the second terminal device. Therefore, when determining a time-frequency resource based on the first information after receiving the first information, the second terminal device cannot select a resource that is the same as that of the hidden node of the second terminal device. This avoids collision and reduces interference between terminal devices. Alternatively, the first terminal device serves as a data receiver of the second terminal device, and the X sets of candidate single-time-unit resources determined by the first terminal device may include time-frequency resources that have been used and reserved by an exposed node of the second terminal device. Therefore, when determining a time-frequency resource based on the first information after receiving the first information, the second terminal device may select a time-frequency resource reserved by the exposed node of the second terminal device. This improves resource utilization.

Optionally, in an implementation scenario of this embodiment of this application, the first information may be indicated by M bits, which are determined based on the length of the first time window, the first number of sub-channels, and a total number of sub-channels of the first resource pool.

Optionally, values of M vary in different implementations of this embodiment of this application.

In a possible implementation, the number M of bits, the length of the first time window, the first number of sub-channels, and the total number of sub-channels of the first resource pool satisfy the following first formula:

$$M = Y \times (N_{subCH} - L_{subCH,1} + 1), \text{ where}$$

Y is the length of the first time window, that is, a number of time units included in the first time window, $N_{subCH}$ is the total number of sub-channels of the first resource pool, and $L_{subCH,\,1}$ is the first number of sub-channels.

It may be understood that, for the first resource pool including $N_{subCH}$ sub-channels, a maximum number of candidate single-time-unit resources in the first time window including Y time units is $M = Y = Y \times (N_{subCH} - L_{subCH,1} + 1)$. Therefore, M bits whose number of bits satisfies the first formula may indicate availability of each candidate single-time-unit resource in the first time window, and available candidate single-time-unit resources in the first time window that are indicated by the M bits are the K candidate single-time-unit resources.

Optionally, in this implementation, that the first information is indicated by M bits may include: The M bits constitute a bitmap (bitmap), and every $N_{subCH} - L_{subCH,1} + 1$ bits in the bitmap indicate availability of each candidate single-time-unit resource in one of the Y time units included in the first time window. To be specific, availability of a candidate single-time-unit resource in one time unit is indicated by $N_{subCH} - L_{subCH,1} + 1$ bits, and availability of all candidate single-time-unit resources in the Y time units is indicated by $M = Y \times (N_{subCH} - L_{subCH,1} + 1)$ bits.

For example, the total number of sub-channels of the first resource pool is 4, the first number of sub-channels is 2, and the length of the first time window is five time units. In this case, a total number of bits of the bitmap is 15. In addition, available sub-channels in the first time window are represented by cells with a diagonally stripped pattern in FIG. 12.

Figure 12:
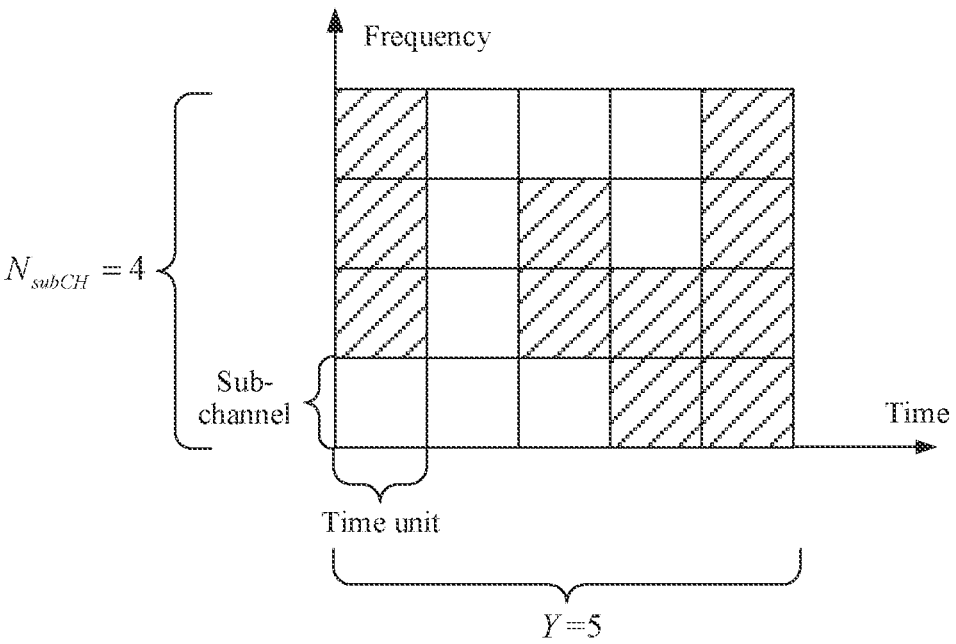
FIG. 12 is a schematic diagram of candidate single-time-unit resources in a first time window according to an embodiment of this application.
Figure 12:
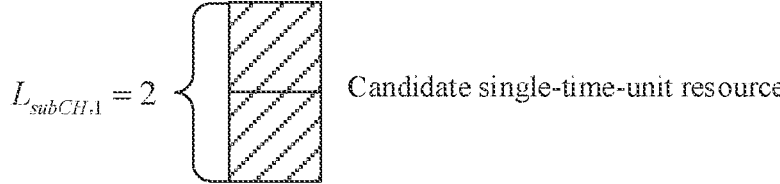

As shown in FIG. 12, three available sub-channels are identified in the 1st time unit. It can be learned, based on that the first number of sub-channels is equal to 2, that there are two candidate single-time-unit resources in the 1st time unit. The 1st candidate single-time-unit resource includes a sub-channel 1 and a sub-channel 2 in frequency domain, and the 2nd candidate single-time-unit resource includes the sub-channel 2 and a sub-channel 3 in frequency domain. Similarly, there is no candidate single-time-unit resource in the 2nd time unit, there is one candidate single-time-unit resource in each of the 3rd time unit and the 4th time unit, and there are three candidate single-time-unit resources in the 5th time unit. For example, the K candidate single-time-unit resources indicated by the first information include all candidate single-time-unit resources in the first time window. In this scenario, K is equal to 7.

Figure 13:
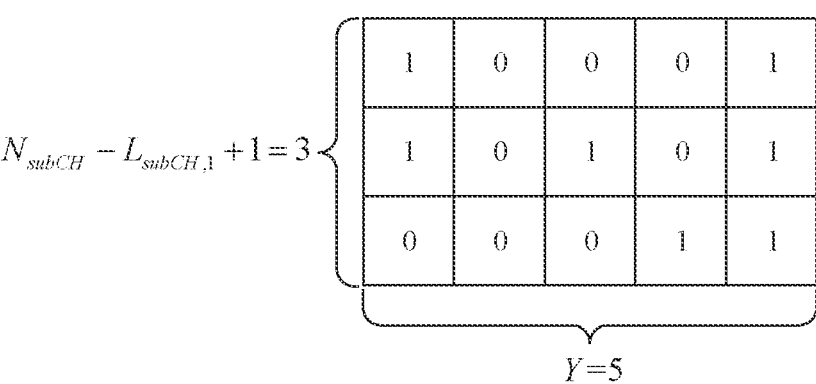
FIG. 13 is a schematic diagram of a bitmap according to an embodiment of this application.

Optionally, columns of the bitmap may one-to-one correspond to time units included in the first time window, and rows of the bitmap may one-to-one correspond to candidate single-time-unit resources in the time units. Based on the example shown in FIG. 12, the bitmap may be shown in FIG. 13. The $1^{st}$ column of the bitmap is represented as 011. A value of the $1^{st}$ bit equal to "0" indicates that first two sub-channels from bottom to top in the $1^{st}$ time unit are not candidate single-time-unit resources. A value of the $2^{nd}$ bit equal to "1" indicates that middle two sub-channels from bottom to top are candidate single-time-unit resources. A value of the $3^{rd}$ bit equal to "1" indicates that last two sub-channels from bottom to top are candidate single-time-unit resources. Similarly, a value in a column corresponding to each time unit may be obtained. Then, values in columns corresponding to time units may be combined to obtain a value of the bitmap. The values may be combined based on time units, for example, 011000010100111. Alternatively, the values may be combined based on sub-channels, for example, 000111010110001. Alternatively, the values may be combined in another manner. This is not specifically limited in this embodiment of this application.

In another possible implementation, the number M of bits, the length of the first time window, the first number of sub-channels, and the total number of sub-channels of the first resource pool satisfy the following second formula:

$$M=Y+y\times(N_{subCH}-L_{subCH,1}+1), \text{ where}$$

Y is the length of the first time window, y is a total number of first-type time units in the first time window, there is a candidate single-time-unit resource in the first-type time unit, $N_{subCH}$ is the total number of sub-channels of the first resource pool, and $L_{subCH, 1}$ is the first number of sub-channels.

It may be understood that, for the first resource pool including $N_{subCH}$ sub-channels, a maximum number of candidate single-time-unit resources in the first time window including Y time units is $M=Y\times(N_{subCH}-L_{subCH,1}+1)$. However, not all of the Y time units have candidate single-time-unit resources. Therefore, a bitmap whose number of bits is Y may indicate a time unit in which a candidate single-time-unit resource exists. When there are candidate single-time-unit resources in y of Y time units, a bitmap whose number of bits is $y\times(N_{subCH}-L_{subCH,1}+1)$ may indicate each candidate single-time-unit resource in the y time units. Finally, the two bitmaps are combined to obtain a bitmap whose number of bits satisfies the second formula.

Optionally, in this implementation, that the first information is indicated by M bits may include; The M bits constitute a bitmap, the bitmap includes a first bitmap and a second bitmap, the first bitmap indicates y first-type time units, the second bitmap indicates availability of each candidate single-time-unit resource in an $i^{th}$ first-type time unit, and i is a positive integer from 1 to y.

Figure 14:
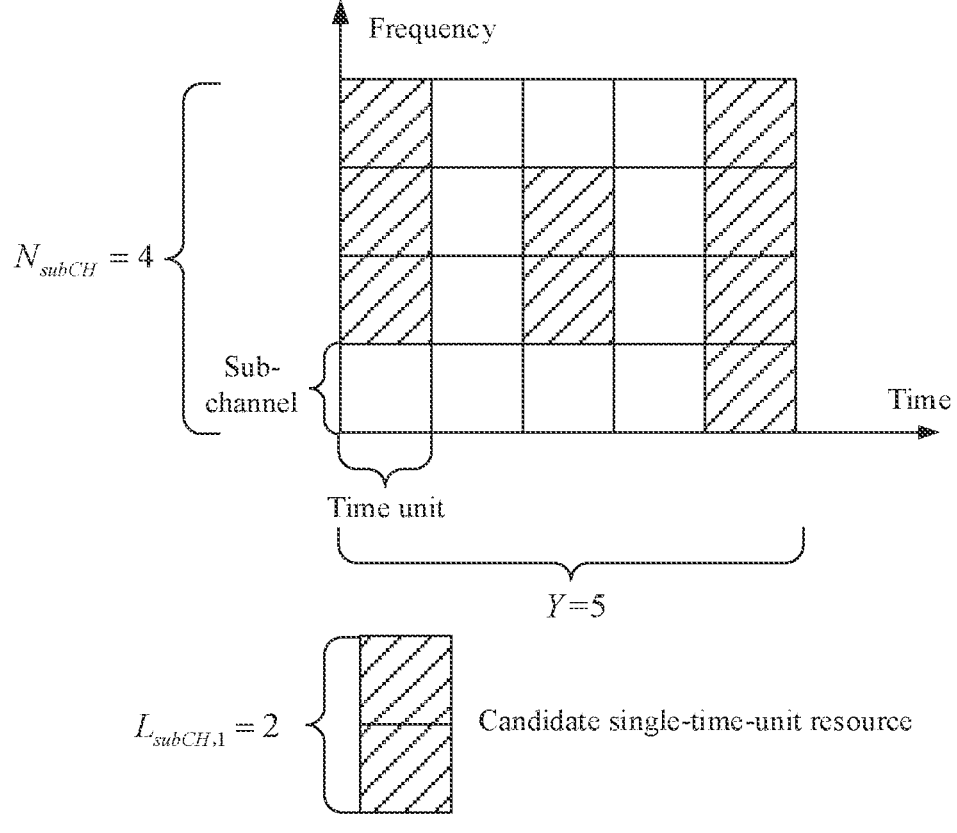
FIG. 14 is a schematic diagram of other candidate single-time-unit resources in a first time window according to an embodiment of this application.

For example, the total number of sub-channels of the first resource pool is 4, the first number of sub-channels is 2, the length of the first time window is five time units, and available sub-channels in the first time window are shown by represented by cells with a diagonally stripped pattern in FIG. 14.

As shown in FIG. 14, three available sub-channels are identified in the $1^{st}$ time unit. It can be learned, based on that the first number of sub-channels is equal to 2, that there are two candidate single-time-unit resources in the $1^{st}$ time unit, the $1^{st}$ candidate single-time-unit resource includes a sub-channel 1 and a sub-channel 2 in frequency domain, and the $2^{nd}$ candidate single-time-unit resource includes the sub-channel 2 and a sub-channel 3 in frequency domain. Similarly, there is no candidate single-time-unit resource in the $2^{nd}$ time unit and the $4^{th}$ time unit, there is one candidate single-time-unit resource in the $3^{rd}$ time unit, and there are three candidate single-time-unit resources in the $5^{th}$ time unit. For example, the K candidate single-time-unit resources indicated by the first information include all candidate single-time-unit resources in the first time window. In this scenario, K is equal to 6.

Figure 15:
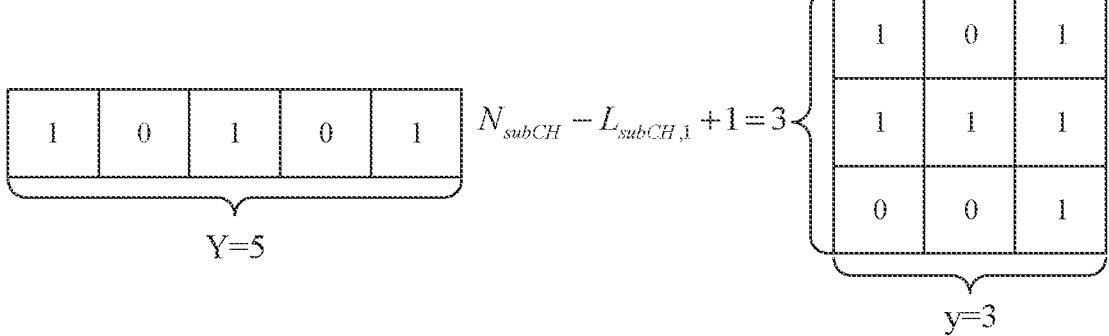
FIG. 15 is a schematic diagram of another bitmap according to an embodiment of this application.

Based on the example in FIG. 14, a number of first-type time units is 3. Therefore, a first bitmap whose number of bits is 5 may indicate the three first-type time units. For example, bits in the first bitmap one-to-one correspond to time units. When a value of a bit is "1", it indicates that a time unit corresponding to the bit is the first-type time unit. As shown in FIG. 15, the first bitmap may be 10101. Then, it may be determined that a number of bits of the second bitmap is 9 based on the number of first-type time units, the first number of sub-channels, and the total number of sub-channels of the first resource pool.

Optionally, columns of the second bitmap may one-to-one correspond to first-type time units, and rows of the second bitmap may one-to-one correspond to candidate single-time-unit resources in the first-type time units. Based on the example shown in FIG. 14, the second bitmap may be shown in FIG. 15. The $1^{st}$ column of the second bitmap is represented as 011. A value of the $1^{st}$ bit equal to "0" indicates that first two sub-channels from bottom to top in the $1^{st}$ time unit are not candidate single-time-unit resources. A value of the $2^{nd}$ bit equal to "1" indicates that middle two sub-channels from bottom to top are candidate single-time-unit resources. A value of the $3^{rd}$ bit equal to "1" indicates that last two sub-channels from bottom to top are candidate single-time-unit resources. Similarly, a value in a column corresponding to each time unit in the second bitmap may be obtained. Then, values in columns corresponding to time units in the second bitmap may be combined to obtain a value of the second bitmap. The values may be combined based on time units, for example, 0110101111. Alternatively, the values may be combined based on sub-channels, for example, 001111101. Alternatively, the values may be combined in another manner. This is not specifically limited in this embodiment of this application.

In still another possible implementation, the number M of bits, the length of the first time window, the first number of sub-channels, and the total number of sub-channels of the first resource pool satisfy the following third formula:

$$M=\lceil \log_2(Y^K) \rceil + \lceil \log_2(N_{subCH}-L_{subCH,1}+1)^K \rceil, \text{ where}$$

Y is the length of the first time window, $N_{subCH}$ is the total number of sub-channels of the first resource pool, $L_{subCH,1}$ is the first number of sub-channels, and $\lceil\ \rceil$ represents rounding up.

Optionally, in this implementation, that the first information is indicated by M bits may include: $X_1$ of the M bits indicate time domain information of K candidate single-time-unit resources, where $X_1=\lceil \log_2(Y^K) \rceil$; and other $X_2$ bits in the M bits indicate frequency domain information of the K candidate single-time-unit resources, where $X_2=\lceil \log_2 (N_{subCH}-L_{subCH,1}+1)^K \rceil$.

It may be understood that there are Y possibilities for a time domain location of each of the K candidate single-time-unit resources indicated by the first information. In this case, the K candidate single-time-unit resources correspond to $Y^K$ possibilities. Therefore, $\lceil \log_2(Y^K) \rceil$ bits may indicate time domain information of the K candidate single-time-unit resources.

It may be understood that a maximum number of candidate single-time-unit resources in a single time unit is ($N_{subCH}$-$L_{subCH,1}$+1), in other words, there are ($N_{subCH}$-$L_{subCH,1}$+1) possibilities for a frequency domain location of each candidate single-time-unit resource. In this case, there are a total of ($N_{subCH}$-$L_{subCH,1}$+1)$^K$ possibilities for frequency domain locations of the K candidate single-time-unit resources. Therefore, $\lceil \log_2(N_{subCH}$-$L_{subCH,1}$+1)$^K \rceil$ bits may indicate frequency domain information of the K candidate single-time-unit resources.

Optionally, when the first information indicates in the foregoing manners, the resource indication information transmission method provided in this application may further include: The first terminal device sends second information to the second terminal device. Correspondingly, the second terminal device receives the second information from the first terminal device, and parses the first information based on the second information.

Optionally, the second information includes one or more of the following: the first number of sub-channels, the length of the first time window, a time unit interval, the total number of first-type time units in the first time window, or a number of candidate single-time-unit resources indicated by the first information. The time unit interval is an interval between a time unit for sending the first information and the start time unit of the first time window.

Optionally, when values of M are different, parameters included in the second information may also be different.

In a possible implementation, when a value of M satisfies the foregoing first formula, the second information may include at least one of the following.

First number of sub-channels: It may be understood that if the first number of sub-channels is sent by the second terminal device to the first terminal device, the second information may not include the first number of sub-channels.

Length Y of the first time window: The length Y of the first time window is a number of time units included in the first time window. It may be understood that if the first number of sub-channels is sent by the second terminal device to the first terminal device, the second terminal device may determine the length of the first time window based on the total number M of received bits, the total number of sub-channels of the first resource pool, and the first number of sub-channels. In other words, the second terminal device is capable of parsing the first information. In this case, the second information may not include the length of the first time window. In addition, when the number of time units included in the first time window is a standard-defined value or a value configured in the first resource pool, the second information may not include the length of the first time window.

Time unit interval T: The time unit interval T is a number of time units between a time unit for sending the first information and the start time unit of the first time window. This parameter may assist the second terminal device in obtaining time domain locations of the K candidate single-time-unit resources indicated by the first information. It may be understood that if the time unit for sending the first information is a time unit in, the start time unit of the first time window is m+T+1.

Optionally, if T+Y≤W, both T and Y may be indicated in a manner similar to a start and length indicator value (start and length indicator value. SLIV). In other words, the second information does not need to separately indicate the length of the first time window. W is a standard-defined value, or is a value configured in the first resource pool. SLIV is a technology in a standard that indicates starting OFDM symbols of a physical downlink shared channel (physical downlink shared channel, PDSCH) and a physical uplink shared channel (physical uplink shared channel, PUSCH) in a slot whose length is 14 OFDM symbols and quantities of occupied OFDM symbols.

Optionally, when T and Y are indicated via the SLIV technology, an SLIV may be determined based on T and Y in the following manner: If T+Y≤W/2, SLIV=W·(Y−1)+T; otherwise, SLIV=W·(W−Y+1)+(W−Y−T), where 0<Y≤W−T. After receiving the SLIV value, the second terminal device may parse the SLIV value to obtain T and Y.

In another possible implementation, when a value of M satisfies the foregoing second formula, the second information may include at least one of the following.

First number of sub-channels: Refer to the descriptions of the first number of sub-channels when the value of M satisfies the first formula, and details are not described herein again.

Length Y of the first time window: The length Y of the first time window is a number of time units included in the first time window. It may be understood that if the first number of sub-channels is sent by the second terminal device to the first terminal device, and the first terminal device has indicated the number y of first-type time units to the second terminal device, the second terminal device may determine the length of the first time window based on the total number M of received bits, the total number of sub-channels of the first resource pool, the first number of sub-channels, and the number of first-type time units. In other words, the second terminal device is capable of parsing the first information. In this case, the second information may not include the length of the first time window. In addition, when the number of time units included in the first time window is a standard-defined value or a value configured in the first resource pool, the second information may not include the length of the first time window.

Number y of first-type time units in the first time window: It may be understood that if the first number of sub-channels is sent by the second terminal device to the first terminal device, and the first terminal device has indicated the length Y of the first time window to the second terminal device, or Y is a standard-defined value or configured in the first resource pool, the second terminal device may determine the number of first-type time units based on the total number M of received bits, the total number of sub-channels of the first resource pool, the first number of sub-channels, and the length of the first time window. In other words, the second terminal device is capable of parsing the first information. In this case, the second information may not include the number of first-type time units.

Time unit interval T: Refer to the descriptions of the time unit interval when the value of M satisfies the first formula. Details are not described herein again.

In still another possible implementation, when a value of M satisfies the foregoing third formula, the second information may include at least one of the following.

Number K of candidate single-time-unit resources indicated by the first information; Optionally, if the first terminal device has indicated the length Y of the first time window to the second terminal device, or Y is a standard-defined value or a value configured in the first resource pool, the second terminal device may obtain K based on bits that are in the received M bits and that indicate time domain information, and the length of the first time window. In this case, the second information may not include the number K of candidate single-time-unit resources indicated by the first information. Alternatively, if the first terminal device has indicated the first number of sub-channels to the second terminal device, or the first number of sub-channels is indicated by the second terminal device to the first terminal device, the second terminal device may obtain K based on bits that are in the M bits and that indicate frequency domain information, the total number of sub-channels of the first resource pool, and the first number of sub-channels. In this case, the second information may not include the number of candidate single-time-unit resources indicated by the first information.

First number of sub-channels: Optionally, if the first number of sub-channels is indicated by the second terminal device to the first terminal device, the second information may not include the first number of sub-channels. Alternatively, if the first terminal device has indicated the length Y of the first time window to the second terminal device, or Y is a standard-defined value or a value configured in the first resource pool, the second terminal device may obtain, based on bits that are in the received M bits and that indicate time domain information, and the length of the first time window, the number K of candidate single-time-unit resources indicated by the first information. Further, the first number of sub-channels may be obtained based on bits that are in the M bits and that indicate frequency domain information, the number K of candidate single-time-unit resources, and the total number of sub-channels of the first resource pool. In this case, the second information may not include the first number of sub-channels. Alternatively, if the first terminal device has indicated the number K of candidate single-time-unit resources to the second terminal device, the second terminal device may obtain the first number of sub-channels based on bits that are in the M bits and that indicate frequency domain information, the number K of candidate single-time-unit resources, and the total number of sub-channels of the first resource pool. In this case, the second information may not include the first number of sub-channels.

Length Y of the first time window: Optionally, if the first terminal device has indicated the first number of sub-channels to the second terminal device, or the first number of sub-channels is indicated by the second terminal device to the first terminal device, the second terminal device may obtain, based on bits that are in the received M bits and that indicate frequency domain information, the total number of sub-channels of the first resource pool, and the first number of sub-channels, the number K of candidate single-time-unit resources indicated by the first information. Further, the length of the first time window may be obtained based on bits that are in the M bits and that indicate time domain information, and the number K of candidate single-time-unit resources. In this case, the second information may not include the length of the first time window. Alternatively, if Y is a standard-defined value or a value configured in the first resource pool, the second information may not include the length of the first time window. Alternatively, if the first terminal device has indicated, to the second terminal device, the number K of candidate single-time-unit resources indicated by the first information, the second terminal device may obtain the length of the first time window based on bits that are in the M bits and that indicate time domain information, and the number K of candidate single-time-unit resources. In this case, the second information may not include the length of the first time window.

Time unit interval T: Refer to the descriptions of the time unit interval when the value of M satisfies the first formula. Details are not described herein again.

Based on this solution, because the first terminal device sends the second information to the second terminal device, and the second information includes a parameter for parsing the first information, the second terminal device is enabled to correctly parse the first information based on the second information. Further, in this way, a time-frequency resource can be determined based on the first information, to reduce interference between terminal devices or improve resource utilization.

It may be understood that the foregoing method embodiments of this application may also be understood as an implementation process of the resource allocation mode 2(b) or the resource allocation mode 2(d). In other words, embodiments of this application provide an implementation of the resource allocation mode 2(b) or the resource allocation mode 2(d).

The processor 501 in the communication device 50 shown in FIG. 8 may invoke the application program code stored in the memory 503, to instruct the network device to perform actions of the first terminal device or the second terminal device in the embodiment shown in FIG. 9.

It may be understood that, in embodiments of this application, a first terminal device or a second terminal device may perform some or all of steps in embodiments of this application. The steps are merely examples. In embodiments of this application, other steps or variations of various steps may be further performed. In addition, the steps may be performed in a sequence different from a sequence presented in embodiments of this application, and not all the steps in embodiments of this application need to be performed.

In embodiments of this application, unless otherwise stated or there is a logic conflict, terms and/or descriptions in different embodiments are consistent and may be mutually referenced, and technical features in different embodiments may be combined based on an internal logical relationship thereof, to form a new embodiment.

It may be understood that various numbers in embodiments of this application are merely used for differentiation for ease of description, and are not used to limit the scope of embodiments of this application. The sequence numbers of the foregoing processes do not mean an execution sequence, and the execution sequence of the processes should be determined based on functions and internal logic of the processes.

It may be understood that, in the foregoing embodiments, the method and/or step implemented by the first terminal device may alternatively be implemented by a component (for example, a chip or a circuit) that can be used in the first terminal device, and the method and/or step implemented by the second terminal device may alternatively be implemented by a component (for example, a chip or a circuit) that can be used in the second terminal device.

The foregoing mainly describes the solutions provided in embodiments of this application from a perspective of interaction between network elements. Correspondingly, an embodiment of this application further provides a communication apparatus, and the communication apparatus is configured to implement the foregoing methods. The communication apparatus may be the first terminal device in the foregoing method embodiments, an apparatus including the first terminal device, or a component that can be used in the first terminal device. Alternatively, the communication apparatus may be the second terminal device in the foregoing method embodiments, an apparatus including the second terminal device, or a component that can be used in the second terminal device. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 16:
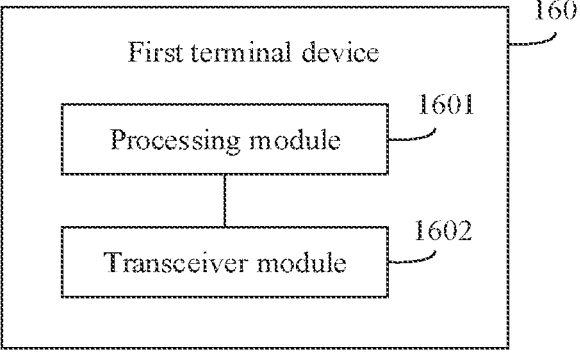
FIG. 16 is a schematic diagram of a structure of a first terminal device according to an embodiment of this application.

For example, the communication apparatus is the first terminal device in the foregoing method embodiments. FIG. 16 is a schematic diagram of a structure of a first terminal device 160. The first terminal device 160 includes a processing module 1601 and a transceiver module 1602. The transceiver module 1602 may also be referred to as a transceiver unit, and is configured to implement a sending and/or receiving function, for example, may be a transceiver circuit, a transceiver machine, a transceiver, or a communication interface.

The transceiver module 1602 may include a receiving module and a sending module, which are respectively configured to perform receiving and sending steps performed by the first terminal device in the foregoing method embodiments. The processing module 1601 may be configured to perform steps other than the receiving and sending steps performed by the first terminal device in the foregoing method embodiments.

For example, the processing module 1601 is configured to determine X sets of candidate single-time-unit resources based on a first number of sub-channels, where the first number of sub-channels is a number of sub-channels to be used by a second terminal device for physical sidelink shared channel PSSCH and/or physical sidelink control channel PSCCH transmission, X is a positive integer, different sets of candidate single-time-unit resources correspond to different selection windows, each of the X sets of candidate single-time-unit resources includes one or more candidate single-time-unit resources, and the candidate single-time-unit resource includes one time unit in time domain and one or more contiguous sub-channels in frequency domain.

The processing module 1601 is further configured to determine first information based on the X sets of candidate single-time-unit resources, where the first information indicates K candidate single-time-unit resources, the K candidate single-time-unit resources are a part of or all candidate single-time-unit resources whose time domain locations are in a first time window in the X sets of candidate single-time-unit resources, the first time window is a time window included in a selection window corresponding to at least one of the X sets of candidate single-time-unit resources, and K is a positive integer.

The transceiver module 1602 is configured to send the first information to the second terminal device.

Optionally, that the transceiver module 1602 is configured to send the first information to the second terminal device includes: The transceiver module 1602 is configured to send second-stage sidelink control information SCI to the second terminal device, where the second-stage SCI includes the first information; the transceiver module 1602 is configured to send a medium access control control element MAC CE to the second terminal device, where the MAC CE includes the first information; or the transceiver module 1602 is configured to send radio resource control RRC signaling to the second terminal device, where the RRC signaling includes the first information.

Optionally, that the processing module 1601 is configured to determine X sets of candidate single-time-unit resources based on a first number of sub-channels includes: The processing module 1601 is configured to determine the X sets of candidate single-time-unit resources through sensing based on the first number of sub-channels.

Optionally, the transceiver module 1602 is further configured to send second information to the second terminal device, where the second information includes one or more of the following: the first number of sub-channels, a length of the first time window, a time unit interval, a total number of first-type time units in the first time window, or a number of candidate single-time-unit resources indicated by the first information, the time unit interval is an interval between a time unit for sending the first information and a start time unit of the first time window, and there is a candidate single-time-unit resource in the first-type time unit.

All related content of the steps in the foregoing method embodiments may be cited in function descriptions of the corresponding functional modules. Details are not described herein again.

In this embodiment, the first terminal device 160 is presented in a form of functional modules obtained through division in an integrated manner. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the first terminal device 160 may be in a form of the communication apparatus 50 shown in FIG. 8.

For example, the processor 501 in the communication apparatus 50 shown in FIG. 8 may invoke the computer-executable instructions stored in the memory 503, to enable the communication apparatus 50 to perform the resource indication information transmission method in the foregoing method embodiment.

Specifically, functions/implementation processes of the processing module 1601 and the transceiver module 1602 in FIG. 16 may be implemented by the processor 501 in the communication apparatus 50 shown in FIG. 8 by invoking the computer-executable instructions stored in the memory 503. Alternatively, a function/implementation process of the processing module 1601 in FIG. 16 may be implemented by the processor 501 in the communication apparatus 50 shown in FIG. 8 by invoking the computer-executable instructions stored in the memory 503, and a function/implementation process of the transceiver module 1602 in FIG. 16 may be implemented by using the communication interface 504 in the communication apparatus 50 shown in FIG. 8.

The first terminal device 160 provided in this embodiment can implement the foregoing resource indication information transmission method, and therefore, for technical effects that can be achieved by the first terminal device 160, refer to the foregoing method embodiments. Details are not described herein again.

Figure 17:
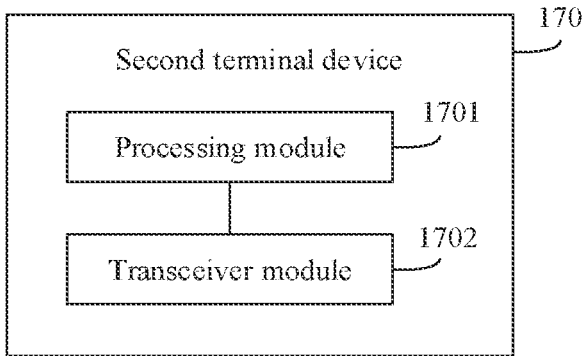
FIG. 17 is a schematic diagram of a structure of a second terminal device according to an embodiment of this application.

Alternatively, for example, the communication apparatus is the second terminal device in the foregoing method embodiments. FIG. 17 is a schematic diagram of a structure of a second terminal device 170. The second terminal device 170 includes a processing module 1701 and a transceiver module 1702. The transceiver module 1702 may also be referred to as a transceiver unit, and is configured to implement a sending and/or receiving function, for example, may be a transceiver circuit, a transceiver machine, a transceiver, or a communication interface.

The transceiver module 1702 may include a receiving module and a sending module, which are respectively configured to perform receiving and sending steps performed by the second terminal device in the foregoing method embodiments. The processing module 1701 may be configured to perform steps other than the receiving and sending steps performed by the second terminal device in the foregoing method embodiments.

For example, the transceiver module 1702 is configured to receive first information from a first terminal device, where the first information indicates K candidate single-time-unit resources, the K candidate single-time-unit resources are a part of or all candidate single-time-unit resources whose time domain locations are in a first time window in X sets of candidate single-time-unit resources, and K and X are positive integers. Different sets of candidate single-time-unit resources correspond to different selection windows, and the first time window is a time window included in a selection window corresponding to at least one of the X sets of candidate single-time-unit resources. The processing module 1701 is configured to determine a first time-frequency resource based on the first information, where the first time-frequency resource is for physical sidelink shared channel PSSCH and/or physical sidelink control channel PSCCH transmission.

Optionally, that the processing module 1701 is configured to determine a first time-frequency resource based on the first information includes: The processing module 1701 is configured to determine the first time-frequency resource based on the first information and a first set of candidate single-time-unit resources, where the first set of candidate single-time-unit resources is a set of candidate single-time-unit resources determined by the second terminal device.

Optionally, that the processing module 1701 is configured to determine a first time-frequency resource based on the first information includes: The processing module 1701 is configured to determine, as the first time-frequency resource, a part of or all of the K candidate single-time-unit resources indicated by the first information.

Optionally, that the transceiver module 1702 is configured to receive first information from a first terminal device includes: The transceiver module 1702 is configured to receive second-stage sidelink control information SCI from the first terminal device, where the second-stage SCI includes the first information; the transceiver module 1702 is configured to receive a medium access control control element MAC CE from the first terminal device, where the MAC CE includes the first information, or the transceiver module 1702 is configured to receive radio resource control RRC signaling from the first terminal device, where the RRC signaling includes the first information.

Optionally, the transceiver module 1702 is further configured to receive second information from the first terminal device, where the second information includes one or more of the following: a first number of sub-channels, a length of the first time window, a time unit interval, a total number of first-type time units in the first time window, or a number of candidate single-time-unit resources indicated by the first information, the time unit interval is an interval between a time unit for sending the first information and a start time unit of the first time window, and there is a candidate single-time-unit resource in the first-type time unit. The processing module 1701 is further configured to parse the first information based on the second information.

All related content of the steps in the foregoing method embodiments may be cited in function descriptions of the corresponding functional modules. Details are not described herein again.

In this embodiment, the second terminal device 170 is presented in a form of functional modules obtained through division in an integrated manner. The "module" herein may be a specific ASIC, a circuit, a processor that executes one or more software or firmware programs, a memory, an integrated logic circuit, and/or another component that can provide the foregoing functions. In a simple embodiment, a person skilled in the art may figure out that the second terminal device 170 may be in a form of the communication apparatus 50 shown in FIG. 8.

For example, the processor 501 in the communication apparatus 50 shown in FIG. 8 may invoke the computer-executable instructions stored in the memory 503, to enable the communication apparatus 50 to perform the resource indication information transmission method in the foregoing method embodiment.

Specifically, functions/implementation processes of the processing module 1701 and the transceiver module 1702 in FIG. 17 may be implemented by the processor 501 in the communication apparatus 50 shown in FIG. 8 by invoking the computer-executable instructions stored in the memory 503. Alternatively, a function/implementation process of the processing module 1701 in FIG. 17 may be implemented by the processor 501 in the communication apparatus 50 shown in FIG. 8 by invoking the computer-executable instructions stored in the memory 503, and a function/implementation process of the transceiver module 1702 in FIG. 17 may be implemented by using the communication interface 504 in the communication apparatus 50 shown in FIG. 8.

The second terminal device 170 provided in this embodiment can implement the foregoing resource indication information transmission method, and therefore, for technical effects that can be achieved by the second terminal device 170, refer to the foregoing method embodiments. Details are not described herein again.

Optionally, an embodiment of this application further provides a communication apparatus (for example, the communication apparatus may be a chip or a chip system). The communication apparatus includes a processor, configured to implement the method in any one of the foregoing method embodiments. In a possible design, the communication apparatus further includes a memory. The memory is configured to store necessary program instructions and necessary data. The processor may invoke program code stored in the memory, to indicate the communication apparatus to perform the method in any one of the foregoing method embodiments. Certainly, the communication apparatus may not include a memory. In another possible design, the communication apparatus further includes an interface circuit. The interface circuit is a code/data read/write interface circuit. The interface circuit is configured to: receive computer instructions (where the computer instructions are stored in a memory, and may be directly read from the memory, or may pass through another component), and transmit the computer instructions to the processor. When the communication apparatus is a chip system, the communication apparatus may include a chip, or may include a chip and another discrete component. This is not specifically limited in this embodiment of this application.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like. In embodiments of this application, the computer may include the apparatuses described above.

Although this application is described with reference to embodiments, in a process of implementing this application that claims protection, a person skilled in the art may understand and implement another variation of the disclosed embodiments by viewing the accompanying drawings, disclosed content, and appended claims. In the claims, "comprising" (comprising) does not exclude another component or another step, and "a" or "one" does not exclude a case of a plurality of. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any or all of modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A resource indication information transmission method, wherein the method comprises:

determining, by a first terminal device, a set of candidate single-time-unit resources based on a first number, wherein the first number indicates a number of sub-channels to be used by a second terminal device for at least one of physical sidelink shared channel (PSSCH) or physical sidelink control channel (PSCCH) transmission, the set of candidate single-time-unit resources comprises a plurality of candidate single-time-unit resources, and each candidate single-time-unit resource of the plurality of candidate single-time-unit resources comprises one time unit in time domain and the first number of contiguous sub-channels in frequency domain;

determining, by the first terminal device, first information based on the set of candidate single-time-unit resources, wherein the first information indicates K candidate single-time-unit resources, the K candidate single-time-unit resources are a part of or all candidate single-time-unit resources whose time domain locations are in a first time window in the set of candidate single-time-unit resources, the first time window is comprised in a selection window corresponding to the set of candidate single-time-unit resources, and K is a positive integer; and sending, by the first terminal device, the first information to the second terminal device.

2. The method according to claim 1, wherein the sending the first information to the second terminal device comprises:

sending second-stage sidelink control information (SCI) to the second terminal device, wherein the second-stage SCI comprises the first information;

sending a medium access control control element (MAC CE) to the second terminal device, wherein the MAC CE comprises the first information; or sending radio resource control (RRC) signaling to the second terminal device, wherein the RRC signaling comprises the first information.

3. The method according to claim 1, wherein the determining a set of candidate single-time-unit resources based on a first number comprises:

determining the set of candidate single-time-unit resources through sensing based on the first number.

4. The method according to claim 1, wherein a start time unit of the first time window is after a time unit m, and the first information is sent in the time unit m.

5. The method according to claim 1, wherein that the K candidate single-time-unit resources are a part of or all candidate single-time-unit resources whose time domain locations are in the first time window in the set of candidate single-time-unit resources comprises:

the K candidate single-time-unit resources are a part of or all candidate single-time-unit resources whose time domain locations are in the first time window in an intersection set or a union set of the set of candidate single-time-unit resources.

6. The method according to claim 1, wherein the first number is 2.

7. The method according to claim 1, wherein the first number is received from the second terminal device, is determined by the first terminal device, or is specified in a protocol.

8. A resource indication information transmission method, wherein the method comprises:

receiving, by a second terminal device, first information from a first terminal device, wherein the first information indicates K candidate single-time-unit resources, the K candidate single-time-unit resources are a part of or all candidate single-time-unit resources whose time domain locations are in a first time window in a set of candidate single-time-unit resources, the set of candidate single-time-unit resources is determined based on a first number and comprises a plurality of candidate single-time-unit resources, each candidate single-time-unit resource of the plurality of candidate single-time-unit resources comprises one time unit in time domain and the first number of contiguous sub-channels in frequency domain, K is a positive integer, and the first time window is comprised in a selection window corresponding to the set of candidate single-time-unit resources; and determining, by the second terminal device, a first time-frequency resource based on the first information, wherein the first time-frequency resource is for at least one of physical sidelink shared channel (PSSCH) or physical sidelink control channel (PSCCH) transmission.

9. The method according to claim 8, wherein the determining a first time-frequency resource based on the first information comprises:

determining the first time-frequency resource based on the first information and a first set of candidate single-time-unit resources, wherein the first set of candidate single-time-unit resources is determined by the second terminal device.

10. The method according to claim 8, wherein the determining a first time-frequency resource based on the first information comprises:

determining, as the first time-frequency resource, a part of or all of the K candidate single-time-unit resources indicated by the first information.

11. The method according to claim 8, wherein the receiving first information from a first terminal device comprises:

receiving second-stage sidelink control information (SCI) from the first terminal device, wherein the second-stage SCI comprises the first information;

receiving a medium access control control element (MAC CE) from the first terminal device, wherein the MAC CE comprises the first information; or receiving radio resource control (RRC) signaling from the first terminal device, wherein the RRC signaling comprises the first information.

12. The method according to claim 8, wherein a start time unit of the first time window is after a time unit m, and the first terminal device sends the first information in the time unit m.

13. The method according to claim 8, wherein that the K candidate single-time-unit resources are a part of or all candidate single-time-unit resources whose time domain locations are in the first time window in the set of candidate single-time-unit resources comprises:

the K candidate single-time-unit resources are a part of or all candidate single-time-unit resources whose time domain locations are in the first time window in an intersection set or a union set of the set of candidate single-time-unit resources.

14. A communication apparatus, wherein the communication apparatus comprises:

at least one processor; and one or more memories coupled to the at least one processor and storing programming instructions for execution by the at least one processor to:

determine a set of candidate single-time-unit resources based on a first number, wherein the first number indicates a number of sub-channels to be used by a second terminal device for at least one of physical sidelink shared channel (PSSCH) or physical sidelink control channel (PSCCH) transmission, the set of candidate single-time-unit resources comprises a plurality of candidate single-time-unit resources, and each candidate single-time-unit resource of the plurality of candidate single-time-unit resources comprises one time unit in time domain and the first number of contiguous sub-channels in frequency domain;

determine first information based on the set of candidate single-time-unit resources, wherein the first information indicates K candidate single-time-unit resources, the K candidate single-time-unit resources are a part of or all candidate single-time-unit resources whose time domain locations are in a first time window in the set of candidate single-time-unit resources, the first time window is comprised in a selection window corresponding to the set of candidate single-time-unit resources, and K is a positive integer; and send the first information to the second terminal device.

15. The communication apparatus according to claim 14, wherein the send the first information to the second terminal device comprises:

send second-stage sidelink control information (SCI) to the second terminal device, wherein the second-stage SCI comprises the first information;

send a medium access control control element (MAC CE) to the second terminal device, wherein the MAC CE comprises the first information; or send radio resource control (RRC) signaling to the second terminal device, wherein the RRC signaling comprises the first information.

16. The communication apparatus according to claim 14, wherein the determine a set of candidate single-time-unit resources based on a first number comprises:

determine the set of candidate single-time-unit resources through sensing based on the first number.

17. The communication apparatus according to claim 14, wherein a start time unit of the first time window is after a time unit m, and the first information is sent in the time unit m.

18. The communication apparatus according to claim 14, wherein that the K candidate single-time-unit resources are K candidate single-time-unit resources whose time domain locations are in the first time window in the set of candidate single-time-unit resources comprises:

the K candidate single-time-unit resources are a part of or all candidate single-time-unit resources whose time domain locations are in the first time window in an intersection set or a union set of the set of candidate single-time-unit resources.

19. A communication apparatus, wherein the communication apparatus comprises:

at least one processor; and one or more memories coupled to the at least one processor and storing programming instructions for execution by the at least one processor to:

receive first information from a first terminal device, wherein the first information indicates K candidate single-time-unit resources, the K candidate single-time-unit resources are a part of or all candidate single-time-unit resources whose time domain locations are in a first time window in a set of candidate single-time-unit resources, the set of candidate single-time-unit resources is determined based on a first number and comprises a plurality of candidate single-time-unit resources, each candidate single-time-unit resource of the plurality of candidate single-time-unit resources comprises one time unit in time domain and the first number of contiguous sub-channels in frequency domain, K is a positive integer, and the first time window is comprised in a selection window corresponding to the set of candidate single-time-unit resources; and determine a first time-frequency resource based on the first information, wherein the first time-frequency resource is for at least one of physical sidelink shared channel (PSSCH) or physical sidelink control channel (PSCCH) transmission.

20. The communication apparatus according to claim 19, wherein the determine a first time-frequency resource based on the first information comprises:

determine the first time-frequency resource based on the first information and a first set of candidate single-time-unit resources, wherein the first set of candidate single-time-unit resources is a set of candidate single-time-unit resources determined by the communication apparatus.

21. The communication apparatus according to claim 19, wherein the determine a first time-frequency resource based on the first information comprises:

determine, as the first time-frequency resource, a part of or all of the K candidate single-time-unit resources indicated by the first information.

22. The communication apparatus according to claim 19, wherein the receive first information from a first terminal device comprises:

receive second-stage sidelink control information (SCI) from a first terminal device, wherein the second-stage SCI comprises the first information;

receive a medium access control control element (MAC CE) from a first terminal device, wherein the MAC CE comprises the first information; or receive radio resource control (RRC) signaling from a first terminal device, wherein the RRC signaling comprises the first information.

* * * * *